(12) United States Patent
Iwata et al.

(10) Patent No.: US 6,304,475 B1
(45) Date of Patent: Oct. 16, 2001

(54) SWITCHING POWER SUPPLY FOR GAS LASER

(75) Inventors: Akihiko Iwata; Junichi Nishimae; Masaaki Tanaka; Takashi Kumagai; Masato Matsubara, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/252,452

(22) Filed: Feb. 18, 1999

(30) Foreign Application Priority Data

Jun. 16, 1998 (JP) .................................................. 10-168498

(51) Int. Cl.[7] ...................... H02M 7/5387; H02M 3/24; H02H 7/122
(52) U.S. Cl. ................................ 363/132; 363/58; 363/98
(58) Field of Search .................................. 363/17, 95, 98, 363/55, 58, 131, 132, 134

(56) References Cited

U.S. PATENT DOCUMENTS

| | | | |
|---|---|---|---|
| 4,811,192 | * 3/1989 | Egawa | 363/132 |
| 4,864,479 | * 9/1989 | Steigerwald et al. | 363/17 |
| 5,001,621 | * 3/1991 | Egawa | 363/132 |
| 5,422,765 | * 6/1995 | Kobayashi et al. | 363/40 |
| 5,638,260 | * 6/1997 | Bees | 363/132 |

FOREIGN PATENT DOCUMENTS

| | | | |
|---|---|---|---|
| 0353406 | 2/1990 | (EP) . | |
| 0565262 | 10/1993 | (EP) | H01S/3/0975 |
| 59-110370 | 6/1984 | (JP) | H02M/1/08 |
| 2-74163 | 3/1990 | (JP) | H02M/7/48 |
| 31714 | 1/1991 | (JP) | H03K/3/57 |
| 3237810 | 10/1991 | (JP) | H03K/3/57 |
| 5102571 | 4/1993 | (JP) | H01S/3/097 |
| 5102572 | 4/1993 | (JP) | H01S/3/097 |
| 5-153766 | 6/1993 | (JP) | H02M/1/06 |
| 5160482 | 6/1993 | (JP) | H01S/3/097 |
| 5-176650 | 7/1993 | (JP) | H02M/7/48 |
| 5-244762 | 9/1993 | (JP) | H02M/1/00 |
| 5-276550 | 10/1993 | (JP) | H02M/7/122 |
| 6-37375 | 2/1994 | (JP) | H01S/3/097 |
| 6-197540 | 7/1994 | (JP) | H02M/7/48 |
| 6310781 | 11/1994 | (JP) | H01S/3/092 |
| 7-59255 | 3/1995 | (JP) | H02H/7/12 |
| 7-231670 | 8/1995 | (JP) | H02M/7/48 |
| 8-51780 | 2/1996 | (JP) | H02M/7/48 |
| 9-129953 | 5/1997 | (JP) | H01S/3/097 |
| 9-266662 | 10/1997 | (JP) | H02M/1/00 |
| 9-312966 | 12/1997 | (JP) | H02M/1/08 |

OTHER PUBLICATIONS

Iwata et al., "Development Of A CVL–MOPA Chain Driven By Semiconductor Pulse Generators", Japanese Electronic Society Paper Journal, vol. D–113, No. 1, 1993, pp. 23–32.
Benz, "Elektrische und Elektronische Schaltelemente" (Electrical and Electronic Switching Elements), vol. 1, Bohmann–Noltemeyer Verlag, Dossenheim–Heidelberg, 1873, pp. 256–258.

* cited by examiner

Primary Examiner—Peter S. Wong
Assistant Examiner—Bao Q. Vu
(74) Attorney, Agent, or Firm—Leydig, Voit & Mayer, Ltd.

(57) ABSTRACT

A laser power supply apparatus supplies AC power to a gas contained in a laser device by way of a pair of dielectric layers, without having to use a transformer to form a high-frequency discharge in a gas to excite the gas, to cause the laser device to radiate. The laser power supply apparatus includes an inverter having arms, each arm including high-speed semiconductor switches connected in series, for directly converting a DC high voltage from a DC power supply to a series of AC output pulses having a much higher AC voltage than the DC high voltage and supplied to the laser device by simultaneously turning on and off those high-speed semiconductor switches in each of the arms, and for furnishing the series of AC output pulses to the laser device at a pair of output terminals.

20 Claims, 26 Drawing Sheets

IN STAGES 7 TO 12

STAGES 7 TO 12:ON
STAGES 1 TO 6:OFF
→
STAGES 7 TO 12:OFF
STAGES 1 TO 6:ON

IN STAGES 1 TO 6

STAGES 7 TO 12:OFF
STAGES 1 TO 6:ON
→
STAGES 7 TO 12:ON
STAGES 1 TO 6:OFF

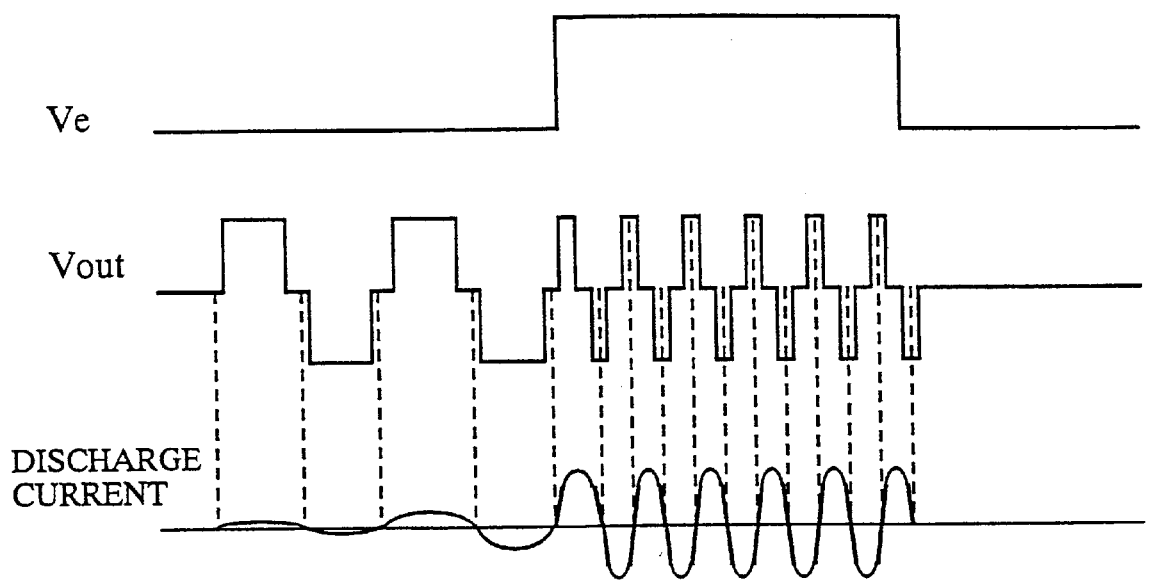
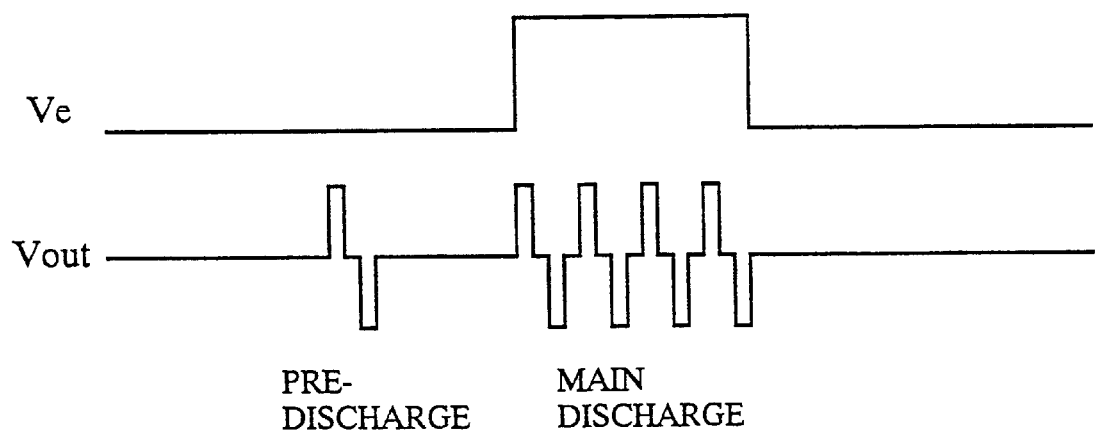

TO LASER CONTROL CIRCUIT

FIG.30 [PRIOR ART]
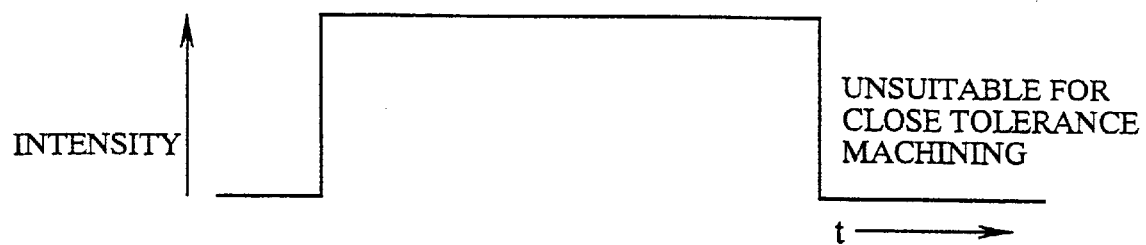
UNSUITABLE FOR
CLOSE TOLERANCE
MACHINING
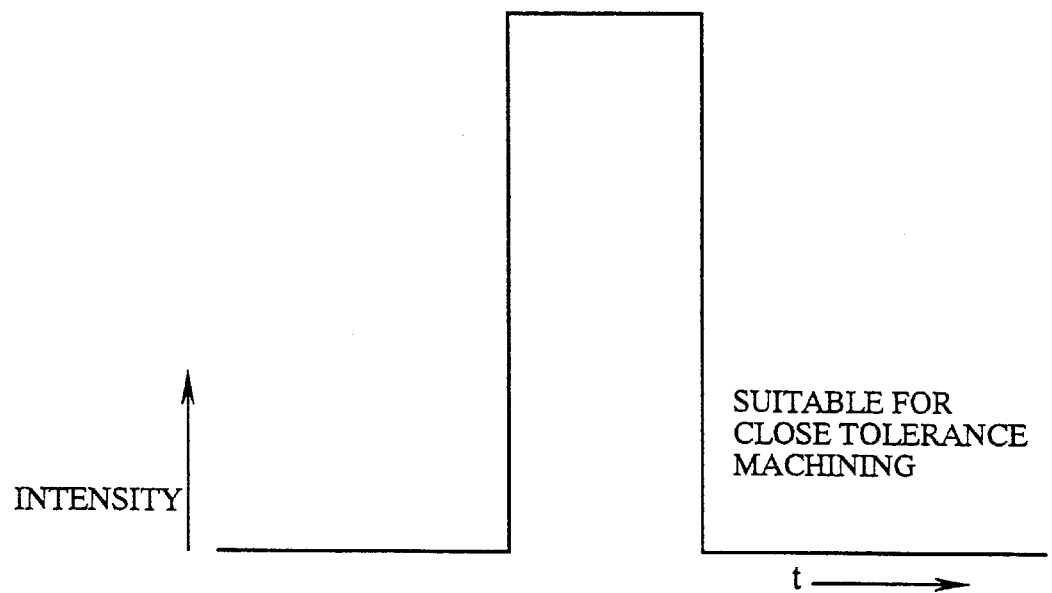
SUITABLE FOR
CLOSE TOLERANCE
MACHINING

FIG.31 (a) [PRIOR ART]
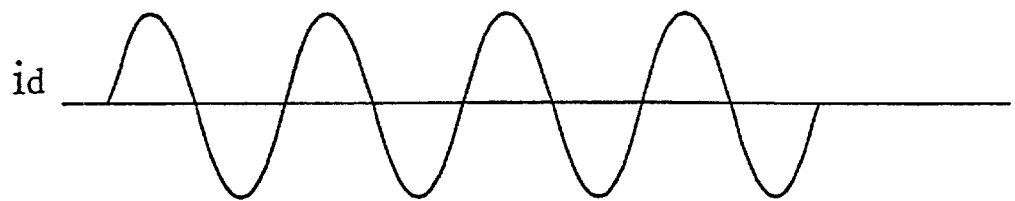
FIG.31 (b) [PRIOR ART]
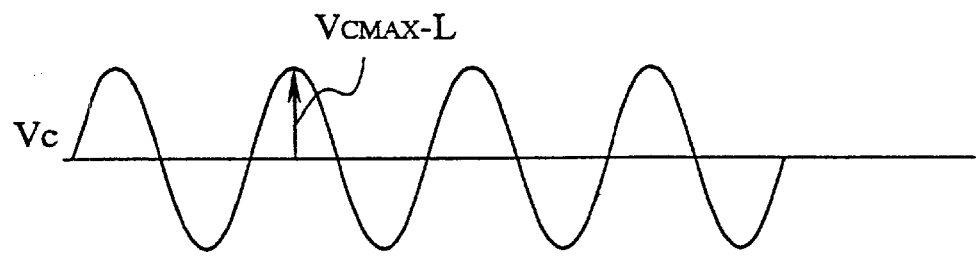
FIG.31 (c) [PRIOR ART]
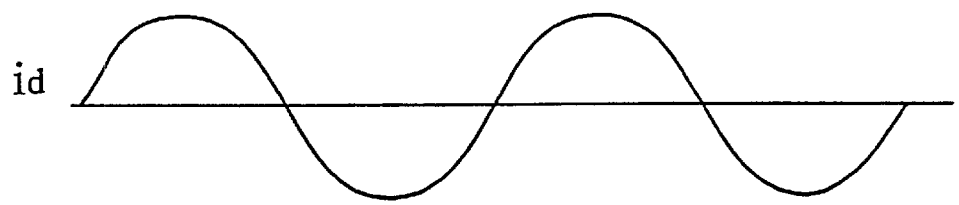
FIG.31 (d) [PRIOR ART]
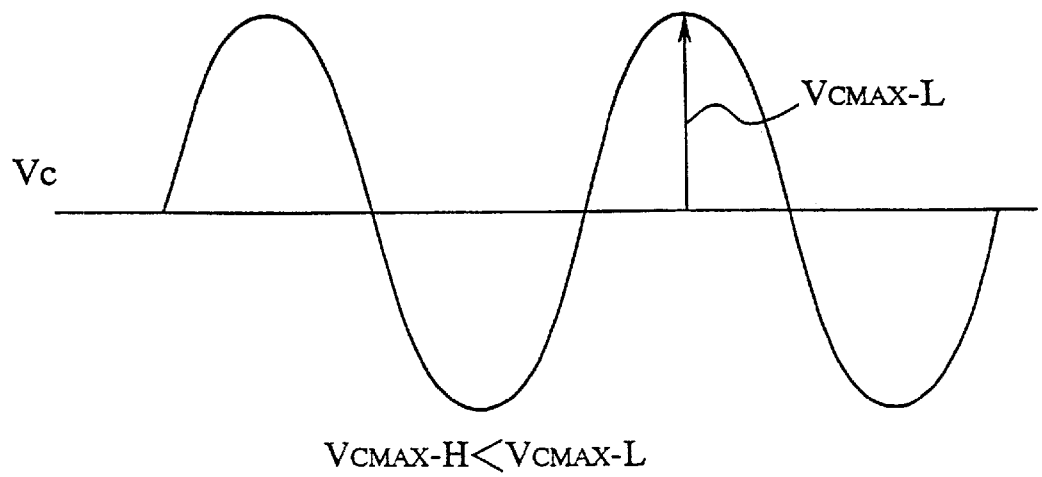
$V_{CMAX-H} < V_{CMAX-L}$

SWITCHING POWER SUPPLY FOR GAS LASER

BACKGROUND OF THE INVENTION

1. Field of the Invention

The present invention relates to a laser power supply apparatus for supplying an AC voltage to a laser device for use in, for example, laser beam machining so as to cause the laser device to discharge and radiate laser light.

2. Description of the Prior Art

Referring now to FIG. 26, there is illustrated a diagram showing the structure of a laser device., As shown in the figure, the laser device is provided with a pair of electrodes 1, a pair of dielectric layers 2 on the pair of electrodes 1, respectively, a high-frequency AC power supply 3, and a partial reflection mirror 4 for causing the laser device to generate laser radiation 6 in cooperation with a total reflection mirror 5. FIG. 27 shows an equivalent circuit of the pair of dielectric layers 2 and a discharge area or space in which a discharge occurs to excite a gas contained in the discharge space to start laser action. In FIG. 27, reference numeral 7 denotes a dielectric capacitance caused by the pair of dielectric layers 2, and 8 denotes an equivalent resistance caused by the discharge area. Further, FIG. 28 is a schematic circuit diagram showing the detailed structure of the high-frequency power supply 3. As shown in the figure, the high-frequency power supply 3 is provided with a plurality of high-speed semiconductor switches 9-1 to 9-4, a DC power supply 10, a high-frequency transformer 11, and a pair of output reactors 12.

As shown in FIG. 28, the plurality of high-speed semiconductor switches 9-1 to 9-4 form a full-bridge inverter. The full-bridge inverter is driven by four control signals S1 to S4 as shown in FIG. 29, for example. The full-bridge inverter generates a rectangular high-frequency voltage Vout. The high-frequency transformer 11 increases and furnishes the rectangular high-frequency voltage Vout to the load by way of the pair of output reactors 12. The pair of output reactors 12 and the dielectric capacitor 7 eliminate high-frequency components in the output current flowing from the high-frequency transformer 11 to the load. An approximately sinusoidal current $I_d$ thus flows through the load and forms a discharge. The discharge generated excites a gas contained in the discharge space to start laser action. The combination of the partial reflection mirror 4 and the total reflection mirror 5 forces the excited gas to radiate in phase. The laser light 6 generated by the laser radiation can be used for laser beam machining, for example. In most cases, the leakage inductance of the high-frequency transformer 11 can be utilized as the pair of output reactors 12.

Although the required intensity and pulse width the laser beam 6 depends on objects to be machined, when a high degree of accuracy is required, the laser beam 6 should have a higher intensity and a shorter pulse width in most cases, as shown in FIG. 30. In order to increase the intensity of the laser light 6, a larger amount of current needs to be passed through the discharge space in the laser device.

Since the impedance of the discharge load is capacitive, when causing a larger amount of current to be passed through the discharge space, the higher the frequency of the AC voltage applied to the load, the lower the voltage Vc across the dielectric capacitor 7, as shown in FIGS. 31(a) to 31(d). As can be seen from FIGS. 31(a) to 31(d), the voltage Vc required to generate the same amount of current $I_d$ decreases with an increase in the frequency of the AC voltage applied to the load. When the thickness of each of the pair of dielectric layers 2 is restricted to a certain value, there is no other choice but to increase the frequency of the AC voltage in order to cause a larger amount of current to be passed through the load, because the voltage across each of the pair of dielectric layers 2 has to be less than its withstand voltage. On the other hand, when the frequency of the AC voltage applied to the load is increased, the amount of current flowing through the load is limited by the electrical size of the pair of output reactors 12, other than the discharge resistance 8. When the electrical size of the pair of output reactors 12 is relatively large, the voltage Vc across the dielectric capacitor 7 drops before the current Id rises up to an adequate value, and hence a large amount of current cannot be passed through the load. The leakage inductance of the high-frequency transformer 11 is utilized as the pair of output reactors 12 in most cases, as previously mentioned. Further, the leakage inductance of the high-frequency transformer 11 cannot be reduced to zero because of its structural limits. Thus the minimum of the total inductance of the pair of output reactors 12 is inevitably determined and the largest amount of current resulting from the minimum inductance is therefore limited. In general, since the leakage inductance of a transformer is proportional to the square of the winding ratio of the secondary winding to the primary winding, the electrical size of the pair of output reactors 12 is increased when the secondary winding is higher than the primary winding in voltage. As a result, the frequency of the AC voltage applied to the load has an upper limit and hence the intensity of the laser light 6 has an upper limit because of the withstand voltage of the dielectric capacitor 7. Accordingly, the prior art laser power supply apparatus using the high-frequency transformer 11 cannot cause gas laser devices to generate laser radiation having a sufficient intensity suitable for close tolerance machining.

SUMMARY OF THE INVENTION

The present invention is made to overcome the above problem. It is therefore an object of the present invention to provide a laser power supply apparatus suitable for close tolerance machining, reducing the electrical size of a pair of power supply reactors connected in series to a discharge load, and determining the maximum discharge power, so as to increase the laser intensity.

In accordance with the present invention, there is provided a laser power supply apparatus for supplying AC power to a gas contained in a laser device by way of a pair of dielectrics so as to form a high-frequency discharge in the gas to excite the gas, thereby causing the laser device to radiate, the laser power supply apparatus comprising: a DC power supply; and an inverter comprised of a plurality of arms each including a plurality of high-speed semiconductor switches in series, for directly converting a DC high voltage from the DC power supply to a series of AC output pulses having a much higher AC voltage to be supplied to the laser device by simultaneously turning on or off those high-speed semiconductor switches in series disposed in each of the plurality of arms, and for furnishing the series of AC output pulses to the laser device by way of a pair of output terminals thereof.

In accordance with a preferred embodiment of the present invention, the inverter includes a plurality of gate circuits respectively corresponding to the plurality of arms, each including a plurality of drive circuits for respectively driving the plurality of high-speed semiconductor switches in series disposed in each of the plurality of arms, the plurality of drive circuits respectively receiving a plurality of AC voltages from a plurality of secondary windings of at least a transformer. Further, one drive circuit for driving a corresponding one of the plurality of high-speed semiconductor switches that is electrically farther from an output of the inverter is the one that receives an AC voltage from one secondary winding that is nearer to a core of the transformer.

Preferably, the inverter further includes a plurality of voltage-dividing capacitors electrically connected in parallel with the plurality of high-speed semiconductor switches in series disposed in each of the plurality of arms, respectively. Further, one voltage-dividing capacitor connected in parallel to a corresponding one of the plurality of high-speed semiconductor switches that is electrically nearer to an output of the inverter has a larger capacitance. As an alternative, the inverter can further include a plurality of voltage-dividing resistors electrically connected in parallel with the plurality of high-speed semiconductor switches in series disposed in each of the plurality of arms, respectively. Further, one voltage-dividing resistor connected in parallel to a corresponding one of the plurality of high-speed semiconductor switches that is electrically nearer to an output of the inverter has a smaller resistance.

Preferably, the inverter further includes a plurality of snubber circuits electrically connected in parallel with the plurality of high-speed semiconductor switches in series disposed in each of the plurality of arms, respectively. Each of the plurality of snubber circuits can include a snubber capacitor and a snubber resistor in parallel with each other, and a diode connected in series to both the snubber capacitor and the snubber resistor. Further, one snubber resistor connected to a corresponding one of the plurality of high-speed semiconductor switches that is electrically nearer to an output of the inverter has a smaller resistance.

Preferably, the DC power supply is divided into two parts, and an intermediate point between the two parts of the DC power supply is grounded.

A clamper circuit can be electrically connected in parallel with the snubber capacitor of each of the plurality of snubber circuits. The clamper circuit can include a Zener diode, a MOSFET having its gate connected to an anode of the Zener diode and its drain connected to an cathode of the Zener diode, a resistor connected between the gate and source of the MOSFET, and another resistor having one end connected to the snubber capacitor and the other end connected to the cathode of the Zener diode.

Preferably, the inverter is a full-bridge inverter including a pair of high-voltage arms connected to a positive terminal of the DC power supply and a pair of low-voltage arms connected to a negative terminal of the DC power supply. Further, the laser power supply apparatus can further comprise a control circuit for generating a first pair of control signals for driving the pair of high-voltage arms and a second pair of control signals for driving the pair of low-voltage arms, the two pairs of control signals being out of phase with one another and triggering the plurality of arms to conduct during certain time periods having the same length, respectively, and for interchanging the first pair of control signals and interchanging the second pair of control signals at predetermined intervals.

Preferably, the inverter is controlled so as to furnish the series of AC output pulses having an arbitrary pulse width and an arbitrary pulse repetition period controlled by on/off controlling signals, and includes a pair of high-voltage arms and a pair of low-voltage arms. Further, the inverter has charging mode in which it alternately brings the pair of high-voltage arms and the pair of low-voltage arms into conduction at predetermined intervals so that either the pair of high-voltage arms or the pair of low-voltage arms are simultaneously forced into conduction to cause the plurality of snubber circuits included in those arms brought into conduction to become charged during a period of time during which the inverter furnishes no AC output pulse.

Preferably, the laser power supply apparatus further comprises a delay circuit for gradually increasing a voltage from the DC power supply at a limited rate of increase and for applying the rising voltage to the plurality of arms of the inverter, the time constant of the delay circuit being greater than the pulse repetition period of on/off control signals for simultaneously switching on or off the plurality of high-speed semiconductor switches in series disposed in each of the plurality of arms. As an alternative, the laser power supply apparatus can further comprise a delay circuit for gradually increasing a voltage from the DC power supply at a limited rate of increase and for applying the rising voltage to the plurality of arms of the inverter, the time constant of the delay circuit being greater than the length of the predetermined intervals in the charging mode for alternately bringing the pair of high-voltage arms and the pair of low-voltage arms into conduction.

Preferably, the length of the predetermined intervals is sufficiently less than the time constant of the snubber circuit in parallel with each of the plurality of high-speed semiconductor switches disposed in each of the plurality of arms, the time constant being defined by the snubber capacitor and the snubber resistor included in the snubber circuit.

Preferably, immediately before generating an AC output pulse having an arbitrary pulse width, the inverter generates an AC output having a different frequency.

Preferably, within a period of time during which the inverter furnishes no AC output pulse, the inverter generates an AC output having a different frequency.

Preferably, the laser power supply apparatus further comprises a control circuit for detecting, rectifying and integrating an output current from the inverter, and for causing the inverter to stop furnishing the series of AC output pulses when the rectified, integrated output current reaches a predetermined value.

Preferably, the laser power supply apparatus further comprises a pair of reactors having the same inductance as each other, inserted between the pair of output terminals of the inverter and the pair of dielectrics, respectively.

Preferably, the inverter includes a pair of high-voltage arms and a pair of low-voltage arms. Further, at least one of the pair of high-voltage arms can include a recovery circuit connected between both ends of thereof and having a switch and a reactor in series, and at least a corresponding one of the pair of low-voltage arms connected to the one of the pair of high-voltage arms includes a recovery circuit connected between both ends of thereof and having a switch and a reactor in series, the two reactors being coupled together by magnetic induction. As an alternative, the inverter includes a pair of high-voltage arms and a pair of low-voltage arms, and, in at least one of the pair of high-voltage arms, a recovery circuit having a switch and a reactor in series can be connected between both ends of each of the plurality of high-speed semiconductor switches in series. Further, in at least a corresponding one of the pair of low-voltage arms connected to the one of the pair of high-voltage arms, a recovery circuit having a switch and a reactor in series can be connected between both ends of each of the plurality of high-speed semiconductor switches in series, the reactors of any two recovery circuits associated with each other and disposed within the high-voltage and low-voltage arms being coupled together by magnetic induction.

Preferably, the inverter includes a plurality of gate circuits respectively corresponding to the plurality of arms, each including a plurality of drive circuits for respectively driving the plurality of high-speed semiconductor switches in series disposed in each of the plurality of arms. Further, each of the plurality of drive circuits can include a monostable multivibrator, responsive to an optical signal applied thereto for turning on a corresponding high-speed semiconductor switch, for enabling the high-speed semiconductor switch to conduct only within a certain period of time.

Preferably, the inverter further includes a plurality of snubber circuits electrically connected in parallel with the plurality of high-speed semiconductor switches in series disposed in each of the plurality of arms, respectively, each of the plurality of snubber circuits including a snubber capacitor and a snubber resistor in parallel with each other, and a diode connected in series to both the snubber capacitor and the snubber resistor in parallel. Further, the inverter can further include a plurality of failure detecting circuits electrically connected with the plurality of high-speed semiconductor switches by way of the plurality of snubber circuits, respectively. The plurality of failure detecting circuits are connected in series. A most upstream one of the plurality of failure detecting circuits has a photocoupler that can be turned on only when the voltage across the snubber capacitor connected to the most upstream failure detecting circuit is within a predetermined range. Each of the remainder of the plurality of failure detecting circuits has a photocoupler that can be turned on only when the voltage across the snubber capacitor connected to each of the remaining failure detecting circuits is within a predetermined range and the photocoupler of a neighboring snubber capacitor upstream is turned on. The output of the photocoupler of at least one of the plurality of failure detecting circuits can be input to a control circuit for controlling the inverter.

Further objects and advantages of the present invention will be apparent from the following description of the preferred embodiments of the invention as illustrated in the accompanying drawings.

BRIEF DESCRIPTION OF THE DRAWINGS

FIG. 15(a) is a schematic circuit diagram showing the structure of a laser power supply apparatus according to a variant of the embodiments of the present invention of FIGS. 1 and 2, which is intended to prevent an overcurrent caused by abruptly charging the plurality of snubber capacitors disposed in each of four arms when a DC power supply is powered on;

FIG. 15(b) is a timing chart showing an example of operations of the laser power supply apparatus of FIG. 15(a);

FIG. 15(c) is a timing chart showing another example of operations of the laser power supply apparatus of FIG. 15(a);

FIG. 16(a) is a schematic circuit diagram showing the structure of a laser power supply apparatus according to another variant of the embodiment of the present invention of FIGS. 1 and 2, which is intended to prevent an overcurrent caused by abruptly charging the plurality of snubber capacitors disposed in each of four arms when a DC power supply is powered on;

FIG. 16(b) is a timing chart showing an example of operations of the laser power supply apparatus of FIG. 16(a);

FIG. 17 is a timing chart showing the waveforms of an output voltage and a discharge current from the inverter of a laser power supply apparatus according a variant of the embodiments of FIGS. 1 and 2;

FIG. 19 is a timing chart showing the waveforms of an output voltage from the inverter of a prior art laser power supply apparatus;

FIG. 30 is a diagram showing the characteristics of laser light required for laser machining; and FIGS. 31(a) to 31(d) are diagrams showing the voltages across the capacitance of a discharge area of the laser device of FIG. 26.

DETAILED DESCRIPTION OF THE PREFERRED EMBODIMENTS

Figure 1:
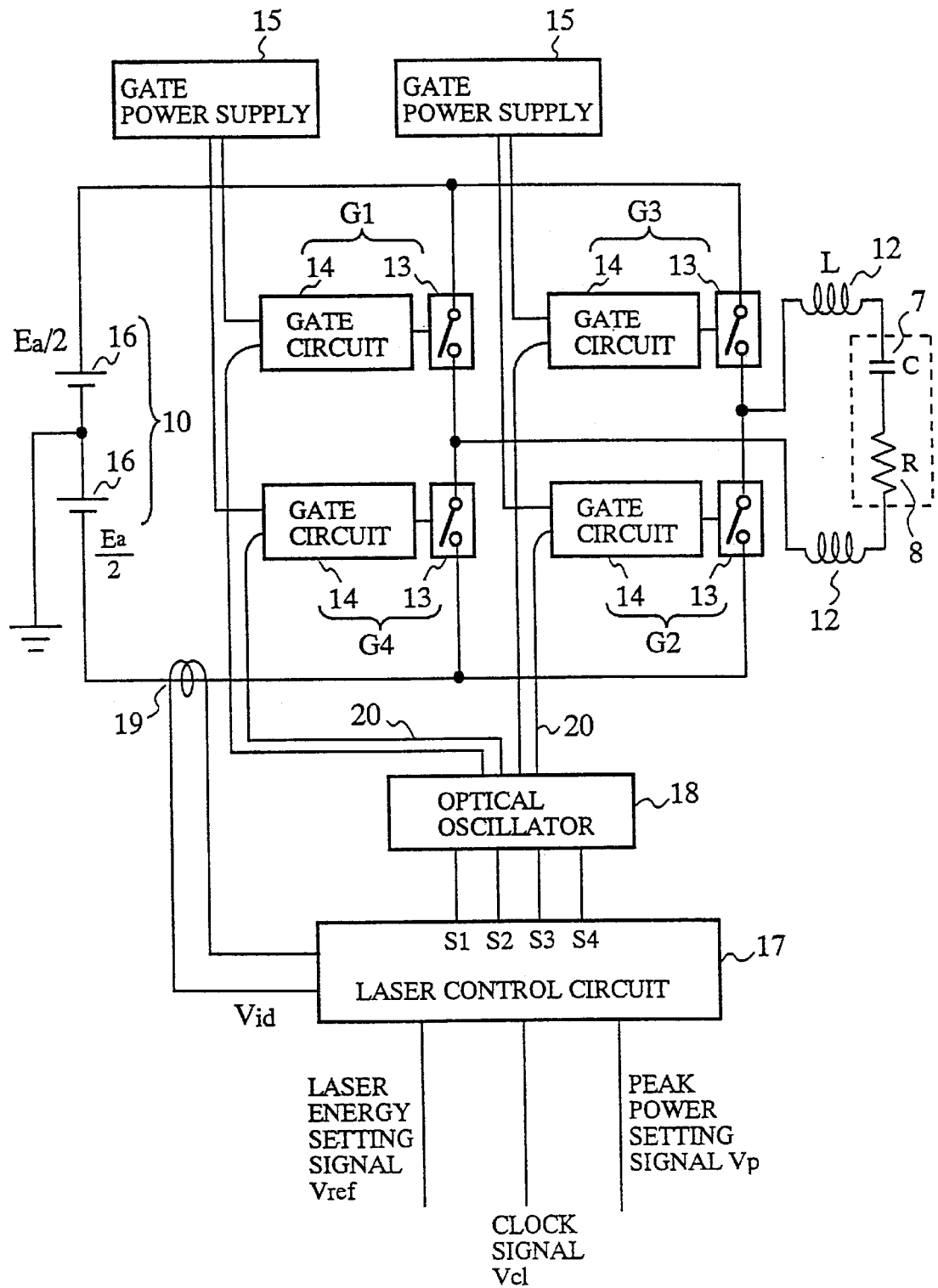
FIG. 1 is a block diagram showing the structure of a laser power supply apparatus according to an embodiment of the present invention.
Figure 2:
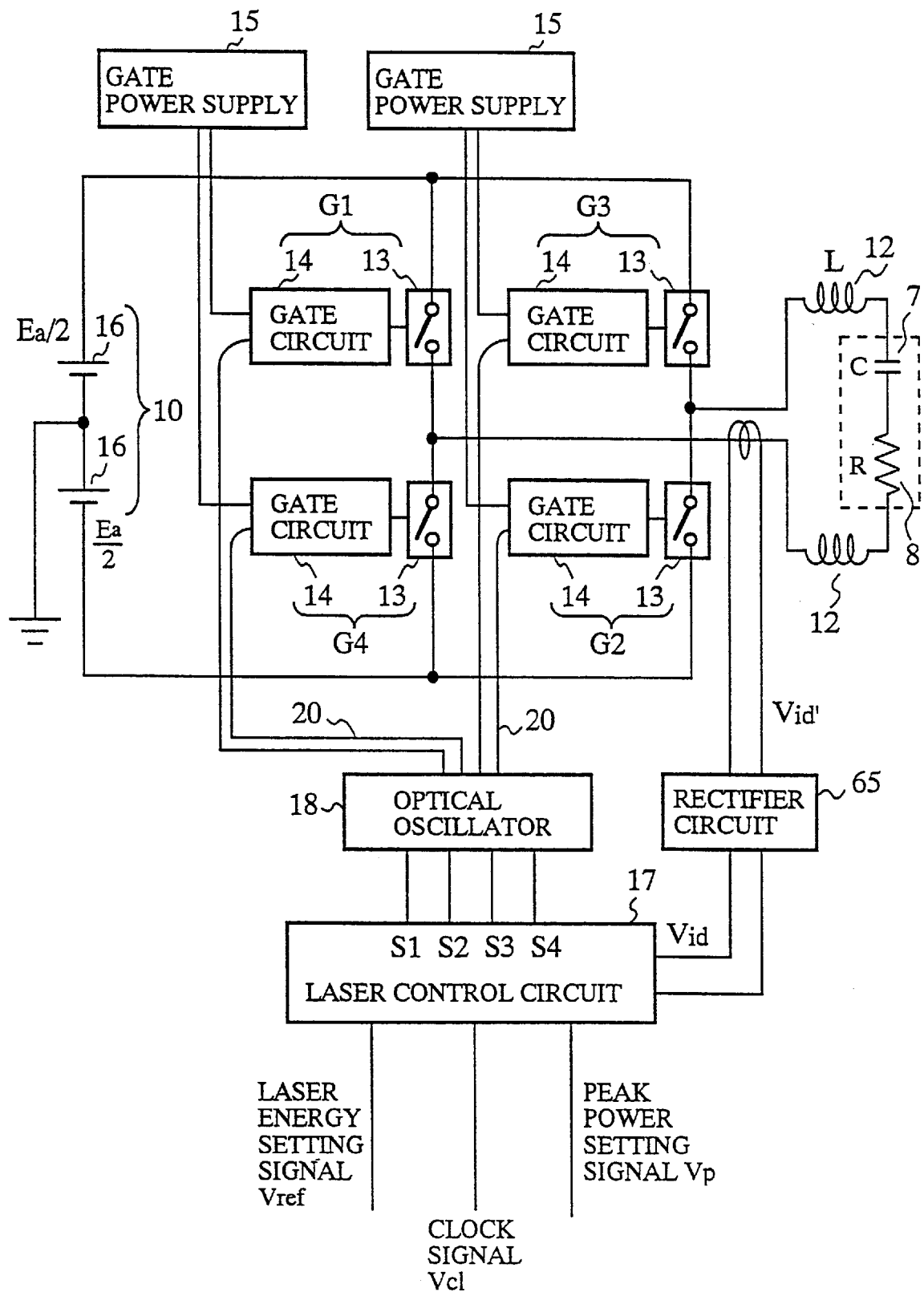
FIG. 2 is a block diagram showing the structure of a laser power supply apparatus according to another embodiment of the present invention.

Referring next to FIG. 1, there is illustrated a block diagram showing the basic structure of a laser power supply apparatus according to an embodiment of the present invention. Further, FIG. 2 shows a block diagram showing the basic structure of a laser power supply apparatus according to another embodiment of the present invention. As shown in the figures, the laser power supply apparatus of the present invention is provided with a plurality of high-voltage switches 13, a plurality of gate circuits 14 for driving corresponding high-voltage switches 13, two gate power supplies 15 for supplying power to two of the plurality of gate circuits 14, a DC power supply 10 comprising of two DC power supply units 16 for providing the same DC output voltage (Ea/2), a laser control circuit 17, an optical oscillator 18 for furnishing on/off control optical signals to the plurality of gate circuits 14, respectively, a plurality of optical fibers 20 via which the plurality of on/off control optical signals are transmitted, and a current sensor 19.

The optical oscillator 18 converts a plurality of on/off control signals furnished by the laser control circuit 17 into a plurality of equivalent on/off control optical signals and then furnishes them to the plurality of gate circuits 14 by way of the plurality of optical fibers 20, respectively. Each gate power supply 15 supplies power two corresponding gate circuits 14. The high-voltage power supply 10 is divided into the two DC power units 16 connected in series and the intermediate point between them is connected to ground. Therefore, a maximum value of the voltage that appears at each point of the circuitry can be limited to the electromotive force (Ea/2) of one DC power unit 16. The withstand voltage design is made easier and therefore the laser power supply apparatus can be downsized. Further, there are provided a pair of output reactors 12 for the discharge load. The pair of output reactors 12 have the same inductance values. As a result, both ends of the discharge load have the same absolute voltage relative to ground. The withstand voltage design is thus made much easier and therefore the laser power supply apparatus can be further downsized.

In accordance with the present invention, since the plurality of high-voltage switches 13 directly performs on/off switching operations on the DC output voltage from the high-voltage power supply 10, the need for a step-up transformer can be eliminated. Therefore, the inductance that exists between the output of the full-bridge inverter provided with the plurality of high-voltage switches 13 and the load is approximately determined by the pair of output reactors 12 inserted between the plurality of high-voltage switches 13 and the load. Because the total inductance of the pair of output reactors 12 can be reduced to an adequately small value, the operating frequency of the inverter can be increased and hence the discharge power can be increased. As a result, the laser intensity can be increased.

Figure 3:
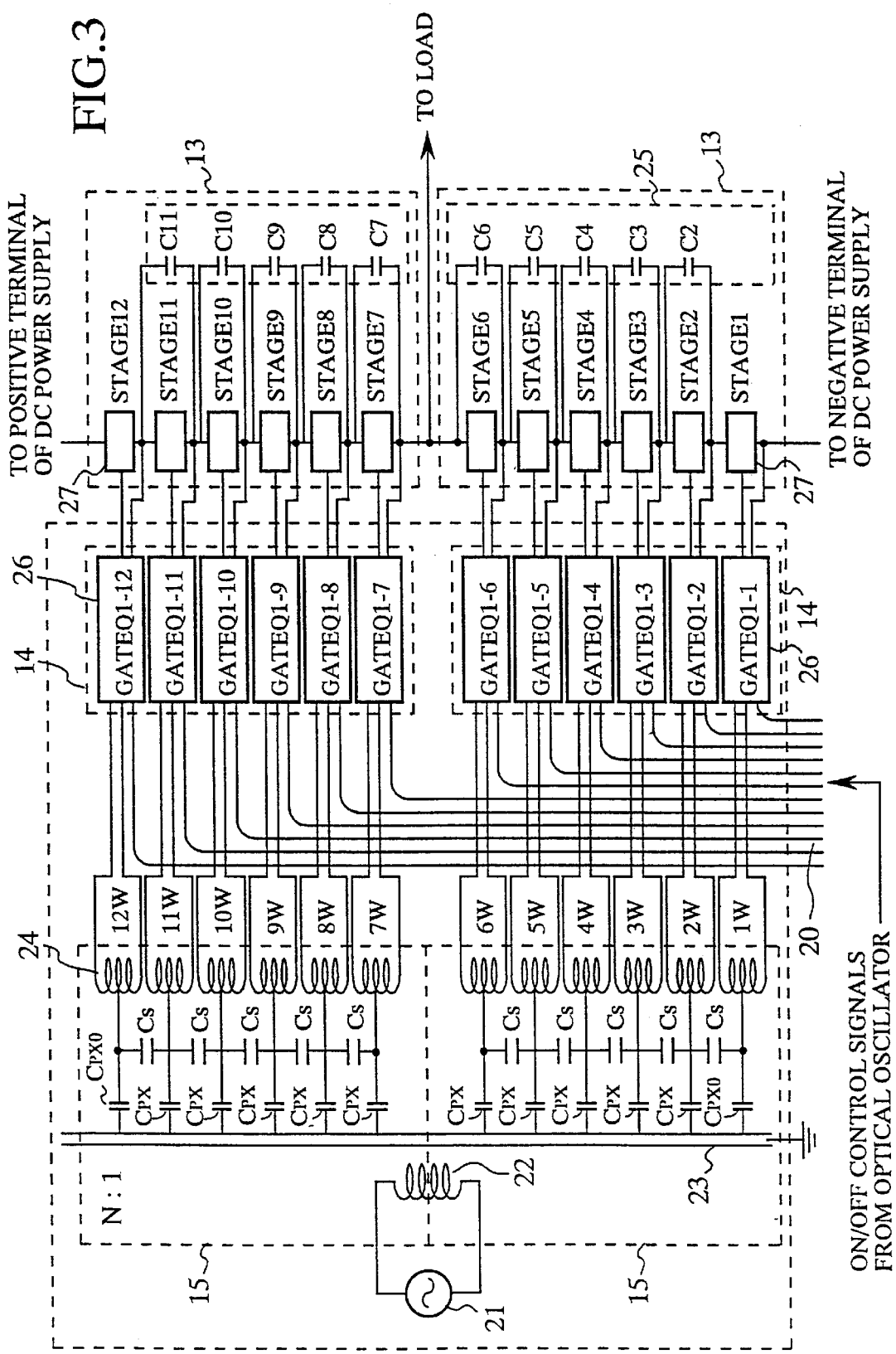
FIG. 3 is a schematic circuit diagram showing the structure of a pair of arms included in an inverter of the laser power supply apparatus according to the present invention.

The inverter according to the present invention is comprised of four arms G1 to G4 each including one high-voltage switch 13 and one gate circuit 14. As shown in FIGS. 1 and 2, two, G1 and G3, of them are connected to the positive terminal of the DC power supply 10 and the remaining two arms, G2 and G4, are connected to the negative terminal of the DC power supply 10. Hereinafter, the two arms G1 and G3 connected to the positive terminal of the DC power supply 10 are referred to as high-voltage arms, and the remaining two arms G2 and G4 connected to the negative terminal of the DC power supply 10 are referred to as low-voltage arms. Referring next to FIG. 3, there is illustrated a schematic circuit diagram showing the detailed structure of part of the laser power supply apparatus including a pair of high-voltage and low-voltage arms provided with one pair of two gate circuits 14 and one pair of two high-voltage switches 13, and one gate power supply 15. As shown in the figure, the gate power supply 15 is provided with a transformer including a primary winding 22 connected to a commercial power supply 21, a plurality of secondary windings 24, and a core 23. There exist stray capacitances Cpx0 and Cpx between the core 24 and the plurality of the secondary windings 24, and there exists stray capacitance Cs between any two neighboring secondary windings 24. Each gate circuit 14 includes a plurality of drive circuits 26. Each high-voltage switch 13 includes a plurality of voltage-dividing capacitors 25 and a plurality of switching stages, each of which is a high-speed semiconductor switch 27.

When an AC voltage from the commercial power supply 21 is applied to the primary winding 22, a plurality of voltages appear at the plurality of secondary windings 24 (W1 to W12). Those voltages generated at the plurality of secondary winding 24 of the transformer are supplied to the plurality of drive circuits 26 included in the two gate circuits. In response to on/off control optical signals applied thereto by way of a plurality of optical fibers 20, the plurality of drive circuits 26 can generate voltages to drive the plurality of high-speed semiconductor switches 27 included in the two high-voltage switches 13, respectively. Since those high-speed semiconductor switches 27 are connected in series, they meet a high-voltage requirement as a whole even though each of them has a small withstand voltage. Such the structure in which the plurality of high-speed semiconductor switches are connected in series can eliminate the need for a high-frequency transformer, as previously mentioned. Therefore, the inductance that exists between the output of the full-bridge inverter comprised of the plurality of high-voltage switches 13 and the load is approximately determined by the pair of output reactors 12 inserted between the plurality of high-voltage switches 13 and the load, as previously mentioned. Because the total inductance of the pair of output reactors 12 can be chosen to an adequately small value, the operating frequency of the inverter can be increased and hence the discharge power can be increased. As a result, the laser intensity can be increased.

Figure 4:
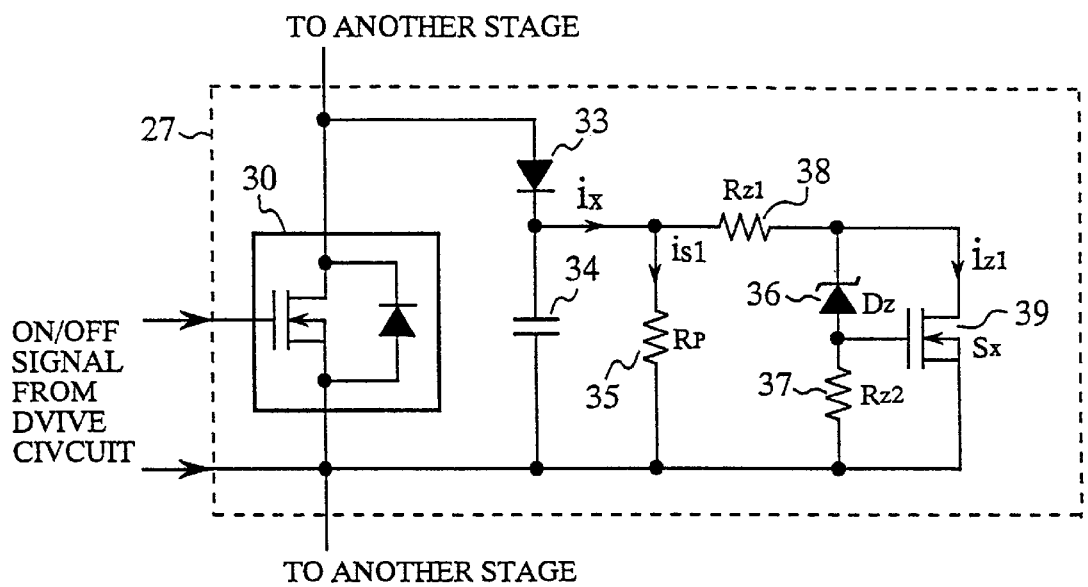
FIG. 4 is a schematic circuit diagram showing the structure of each of a plurality of switching stages connected in series disposed within the pair of arms of the inverter of the present invention of FIG. 3.

Referring next to FIG. 4, there is illustrated a schematic circuit diagram showing the structure of one switching stage, i.e. one high-speed semiconductor switch 27, included in one high-voltage switch 13. As shown in the figure, one high-speed semiconductor switch 27 includes a MOSFET 30, a snubber diode 33, a snubber capacitor 34, a snubber resistor 35, a Zener diode 36, a damper gate resistor 37, a clamper resistor 38, and a clamper FET 39. As shown in FIG. 4, in on switching stage, a snubber circuit, in which the snubber capacitor 34 and the snubber resistor 35 are connected in parallel with each other, and the snubber diode 33 is connected in series to both the snubber capacitor and the snubber resistor, is connected in parallel to the MOSFET 30. Further, a damper circuit is connected in parallel to the snubber capacitor 34, the damper circuit including the Zener diode 36, the damper FET 39 having its gate connected to the anode of the Zener diode 36 and its drain connected to the cathode of the Zener diode 36, the resistor 37 connected between the gate and source of the clamper FET 39, and the resistor 38 having one end connected to the snubber capacitor 34 and the other end connected to the cathode of the Zener diode 36.

Each switching stage can alternatively have two MOSFETs connected in parallel. As can be seen from FIGS. 3 and 4, a plurality of MOSFETs 30 are connected in series within each high-voltage switch 13 because the plurality of high-speed semiconductor switches 27 are connected in series within each high-voltage switch 13. The plurality of drive circuits 26 within each gate circuit 14 can drive the plurality of MOSFETs 30 within a corresponding high-voltage switch simultaneously. As a result, the plurality of high-speed semiconductor switches 27 within one high-voltage switch 13, e.g. the first through sixth stages (STAGE1 to STAGE6) as shown in FIG. 3 can be simultaneously turned on. Similarly, the seventh through twelfth stages (STAGE7 to STAGE12) can be simultaneously turned on. Thus, high-voltage inverting operations can be implemented by alternately turning on the first through sixth stages (STAGE1 to STAGE6) included in one of the pair of high-voltage switches 13 as shown in FIG. 3 and the seventh through twelfth stages (STAGE7 to STAGE12) included in the other one of the pair of high-voltage switches 13.

Figure 5:
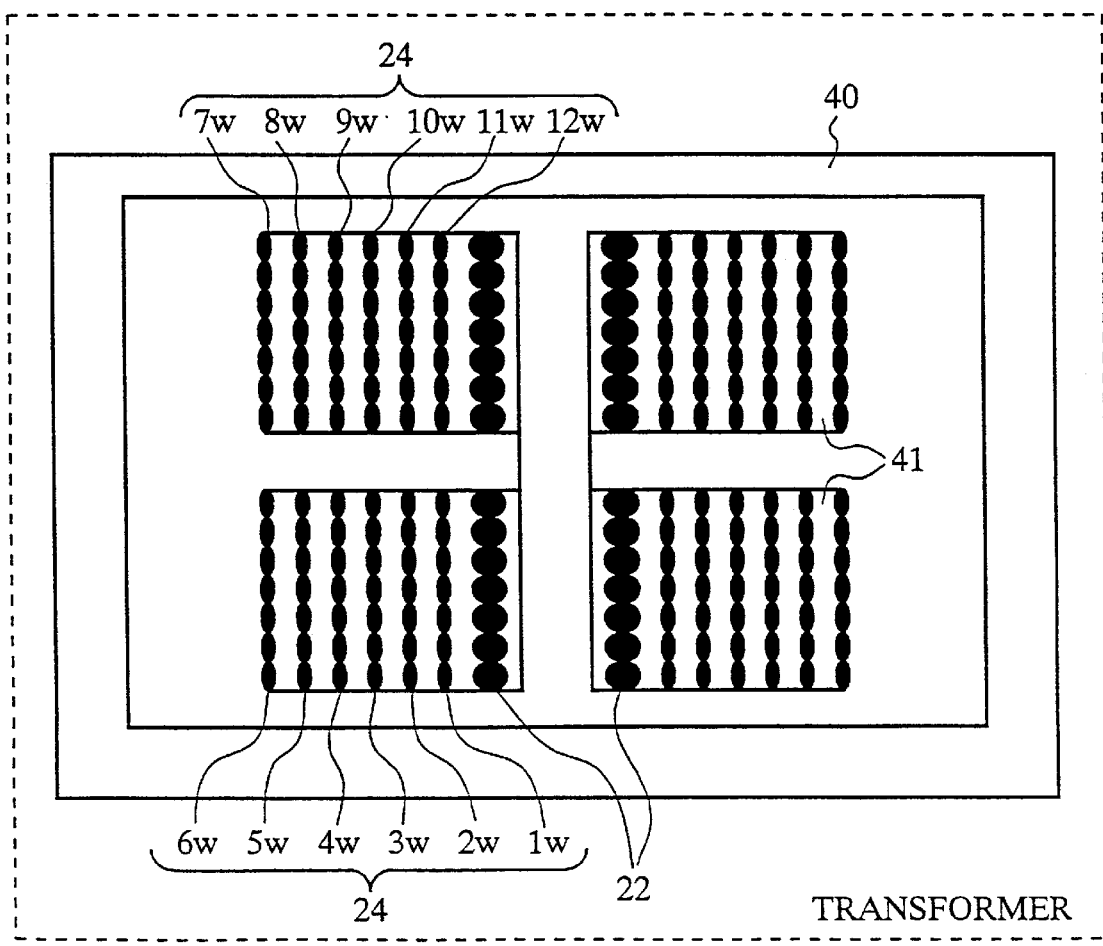
FIG. 5 is a diagram showing the structure of a transformer of a gate power supply for supplying power to two gate circuits for driving the inverter of the present invention.

As shown in FIG. 3, when each of the plurality of drive circuits 26 included in one pair of gate circuits 14 receives an AC voltage from each of the plurality of independent secondary windings 24, each of the plurality of drive circuits 26 converts the AC voltage into a DC voltage and then uses the DC voltage as a power supply to process an on/off control optical signal applied thereto by way of one optical fiber 20. Referring next to FIG. 5, there is illustrated a view showing the detailed structure of the transformer of FIG. 3 intended for one gate power supply 15. As shown in the figure, the transformer includes a core 40, and an insulator 41 for providing electrical isolation among the plurality of secondary windings 24. The plurality of secondary windings 24 are wound in turn around the core so that each of them is overlaid on another secondary winding, with the primary winding 22 being in common use among the plurality of secondary windings 24. The outermost secondary windings 7W and 6W have the largest withstand voltage against the primary winding 22. In contrast, the innermost secondary windings 12W and 1W have the smallest withstand voltage. Each of the innermost secondary windings 12W and 1W can have large stray capacitance between itself and the primary winding 22, and large stray capacitance between itself and the core 40. Therefore, if there is a change in the voltage difference between each of the innermost secondary windings 12W and 1W and either the primary winding 22 or the core 40, a large amount of current flows to charge the above-mentioned stray capacitance and hence the amount of heat generated by charging the stray capacitance is increased. In general, since the core 40 is grounded, the primary winding 22 has a certain potential value of approximately ground. As shown in FIG. 3, the innermost secondary winding 1W is connected to the lowest-voltage part of the lower arm, i.e. the low-voltage arm, which is illustrated on the lower side of FIG. 3, whereas the other innermost secondary winding 12W is connected to the highest-voltage part of the upper arm, i.e, the high-voltage arm, which is illustrated on the upper side of FIG. 3. AS shown in FIG. 2, since the intermediate point of the high-voltage DC power supply 10 is grounded, changes in the potentials of the innermost secondary windings 1W and 2W against the potentials of the primary winding 22 and the core 40 correspond to changes in the potentials of the negative and positive terminals of the high-voltage DC power supply 10, respectively. The configuration of the plurality of secondary windings 24 thus makes it possible to minimize changes in the potentials of the innermost secondary windings 1W and 2W against those of the primary winding 22 and the core 40, and hence reduce the amount of charging current. The load put on the transformer can be reduced to a minimum. As a result, the reliability of the laser power supply apparatus can be improved extensively.

Figure 6:
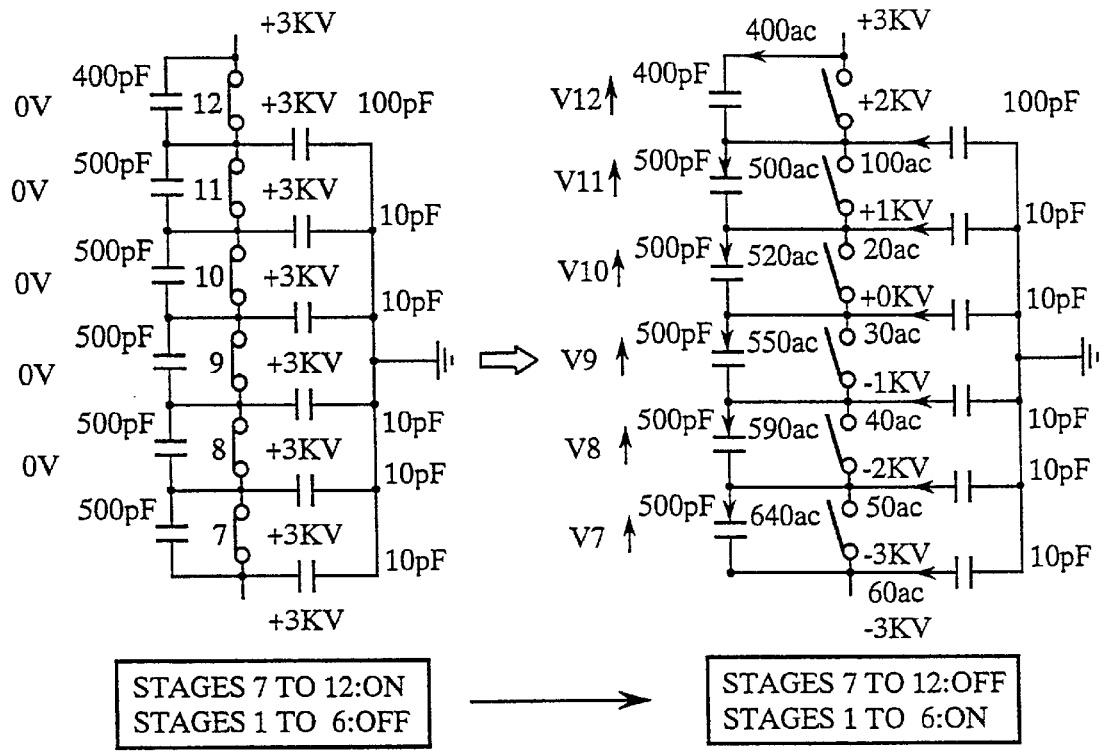
FIG. 6(a) is a diagram showing the shared voltages across seventh through twelfth high-speed semiconductor switches in the circuit of FIG. 3 that are part of the inverter if the inverter does not include a plurality of voltage dividing capacitors.
FIG. 6(b) is a diagram showing the shared voltages across first through sixth high-speed semiconductor switches in the circuit of FIG. 3 that are part of the inverter if the inverter does not include a plurality of voltage dividing capacitors.
Figure 6:
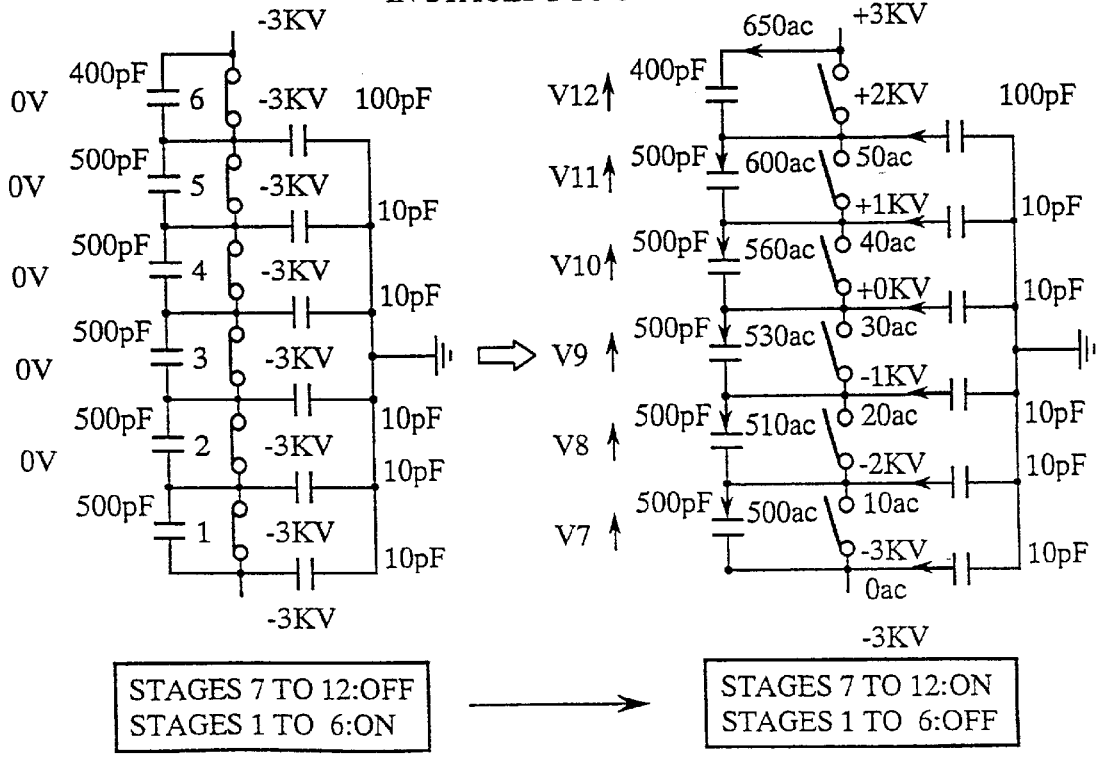
Figure 7:
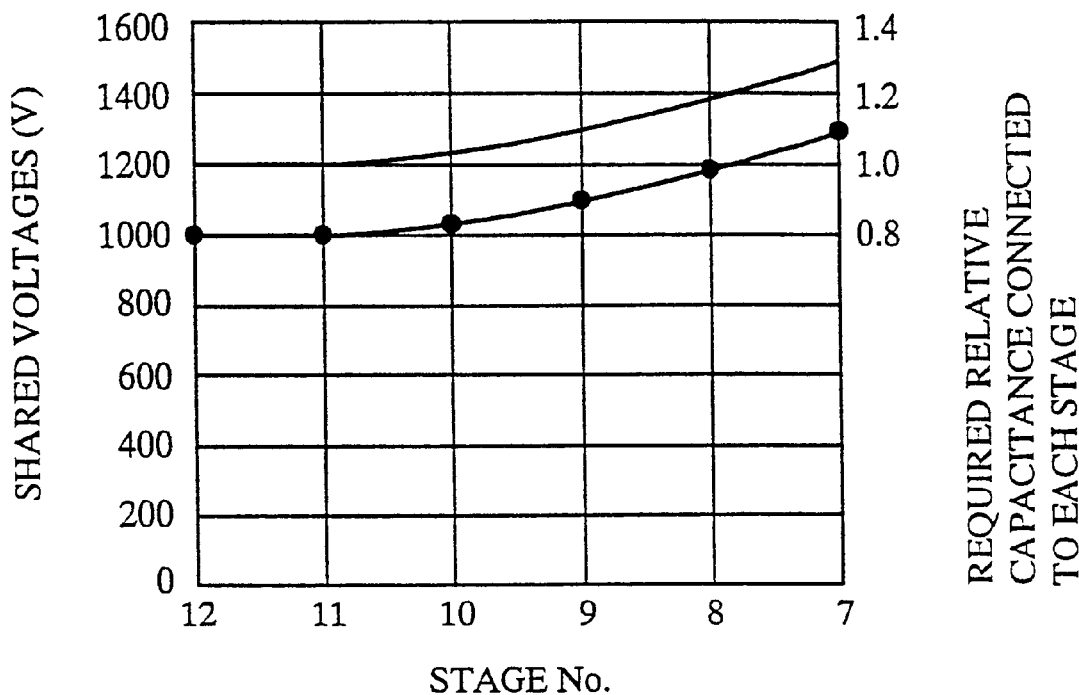
FIG. 7(a) is a graph showing the shared voltages across seventh through twelfth high-speed semiconductor switches when the inverter does not include a plurality of voltage dividing capacitors, and the required relative capacitances of the plurality of voltage dividing capacitors that have to be connected in parallel to the seventh through twelfth high-speed semiconductor switches, respectively.
FIG. 7(b) is a graph showing the shared voltages across first through sixth high-speed semiconductor switches when the inverter does not include a plurality of voltage dividing capacitors, and the required relative capacitances of the plurality of voltage dividing capacitors that have to be connected in parallel to the first through sixth high-speed semiconductor switches, respectively.
Figure 7:
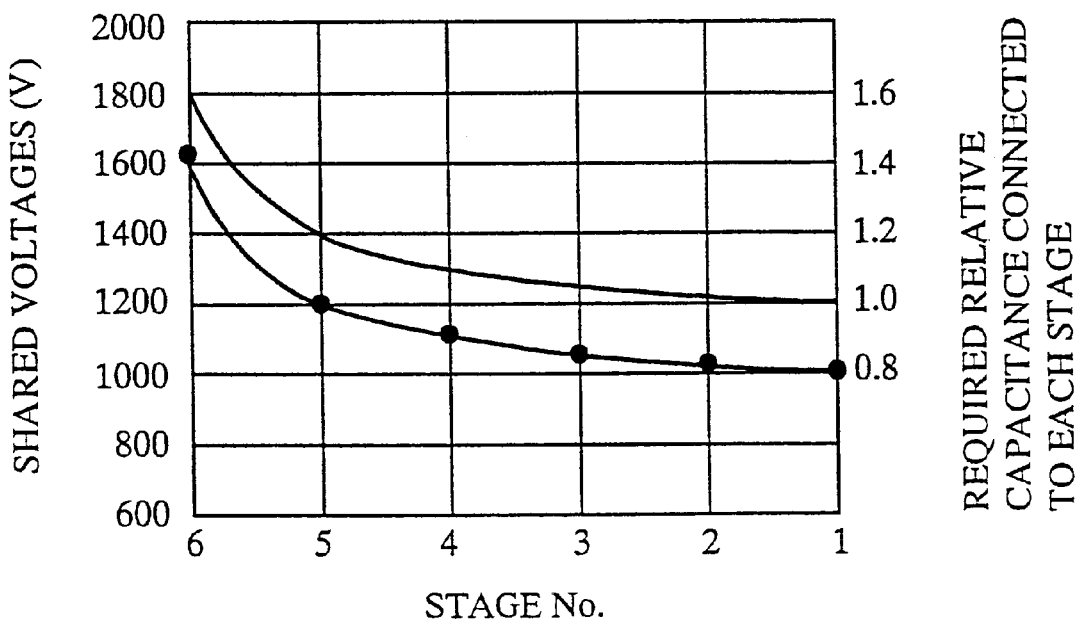

As shown in FIG. 3, each of ten capacitors C2 to C11 is connected in parallel to each of the second through eleventh stages (STAGE2 to STAGE 11) included in one pair of high-voltage and low-voltage arms. Those capacitors C2 to C11 are intended to equalize voltages across the second through eleventh stages. Referring next to FIGS. 6(a) and 6(b), there are illustrated views for explaining the calculation of voltages across the first through twelfth stages without the capacitors C2 to C11. When the high-voltage power supply 10 generates DC output voltages of ±3 kV, and the output capacitance of each stage is 400 pF, the stray capacitance Cs between any two neighboring secondary windings is 100 pF, and the stray capacitance Cpx between the core 23 of the transformer and each of the plurality of secondary windings other than the innermost secondary windings 1W and 12W is 10 pF, the capacitances connected to the seventh through twelfth stages are shown in FIG. 6(a) and the capacitances connected to the first through sixth stages are shown in FIG. 6(b). As shown in FIGS. 6(a) and 6(b), the equivalent parallel capacitance of either of the twelfth and sixth stages is less than those of the other stages by the stray capacitance Cs between any two neighboring secondary windings. In other words, since no secondary winding is connected to the drain of each of the sixth and twelfth stages, each of the sixth and twelfth stages does not include the stray capacitance Cs between any two neighboring secondary windings. The stray capacitance Cpx0 between the core 23 of the transformer and each of the innermost secondary windings 1W and 12W is greater than the stray capacitance Cpx and is approximately equal to the stray capacitance Cs between any two neighboring secondary windings, because the innermost secondary windings W1 and W12 are wound in the vicinity of the primary winding 22 having a potential value of approximately ground. The capacitance of each of the first and twelfth stages against the ground is therefore 100 pF, as shown in FIGS. 6(a) and 6(b). FIG. 6(a) shows the amounts of charges transferred in the high-voltage switch including the seventh through twelfth stages when each of the seventh through twelfth stages makes a transition from its on state to its off state and each of the first through sixth stages makes a transition from its off state to its on state and both ends of each of the seventh through twelfth switching stages have potentials as shown in the figure. The actual amounts of charges transferred in the high-voltage switch slightly differs from those as shown in FIG. 6(a) because both ends of each of the seventh through twelfth switching stages have potentials different from those as shown in FIG. 6(a) according to voltage dividing conditions. FIG. 6(b) shows the amounts of charges transferred in the high-voltage switch including the first through sixth stages when each of the seventh through twelfth stages makes a transition from its off state to its on state and each of the first through sixth stages makes a transition from its on state to its off state and both ends of each of the first through sixth switching stages have potentials as shown in the figure. Referring next to FIG. 7(a), there is illustrated a graph for showing equivalent shared voltages which are obtained by dividing the amounts of charges passed through the seventh through twelfth stages by the equivalent parallel capacitances of these stages, respectively. Similarly, FIG. 7(b) shows a graph for showing equivalent shared voltages which are obtained by dividing the amounts of charges passed through the first through sixth stages by the equivalent parallel capacitances of these stages, respectively. As can be seen from the figures, the nearest stage (e.g. sixth stage (STAGE 6) or seventh stage (STAGE 7)) to the output terminal of each arm has the highest shared voltage. In order to eliminate the nonuniformity of the shared voltages across the plurality of switching stages, they need parallel capacitances having relative values as shown in FIGS. 7(a) and 7(b). However, the first stage does not need an additional capacitance connected in parallel thereto, because the stage capacitance required is the smallest, as shown in FIG. 7(b). Similarly, no additional capacitance is connected in parallel to the twelfth stage, as shown in FIG. 7(a). Thus the plurality of capacitors C2 to C11 of FIG. 3 represent parallel capacitances having relative values as indicated by the relationship of FIGS. 7(a) and 7(b) so as to eliminate the nonuniformity of the shared voltages across the plurality of switching stages. In other words, the nearer to the output terminal of each arm, the larger parallel capacitance each switching stage needs. As a result, the uniformity of the shared voltages across the plurality of switching stages disposed in each of the plurality of arms can be realized and hence the reliability of the laser power supply apparatus is improved extensively.

Figure 8:
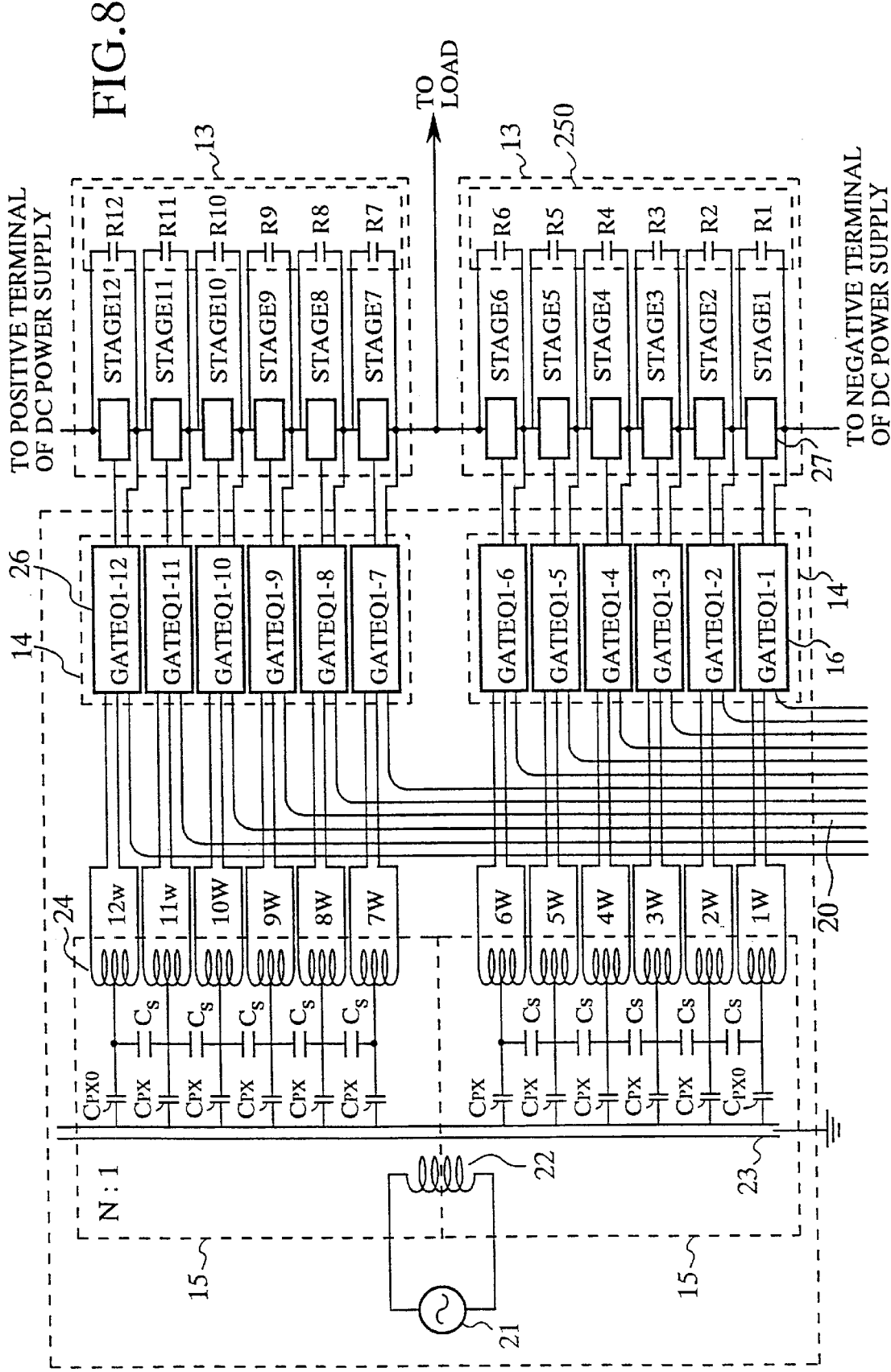
FIG. 8 is a schematic circuit diagram showing the structure of another example of the pair of arms included in the inverter and having a plurality of resistors for equalizing a plurality of shared voltages across the plurality of high-speed semiconductor switches of the pair of arms.

Referring next to FIG. 8, there is illustrated a schematic circuit diagram of a variant in which the plurality of capacitors C2 to C11, which are connected to the both ends of the plurality of stages, respectively, to equalize the voltages across those stages, are replaced by a plurality of resistors 250. As shown in FIGS. 7(a) and 7(b), the nearer to the output terminal of each arm, the larger shared voltage each switching stage has. Therefore, the nearer to the output terminal of each arm, the smaller resistance 250 is connected in parallel to each switching stage. In other words, the resistances of the plurality of resistors are chosen so that the following equations: $R6<R5<R4<R3<R2<R1$ and $R7<R8<R9<R10<R11$ are established. As a result, the uniformity of the shared voltages across the plurality of switching stages disposed in each of the plurality of arms can be realized. In this manner, that is, by decreasing the resistance values of the plurality of resistors 250 as they are nearer to the output terminal of each arm, the uniformity of the shared voltages across the plurality of switching stages disposed in each of the plurality of arms can be implemented and hence the reliability of the laser power supply apparatus is improved extensively.

Figure 9:
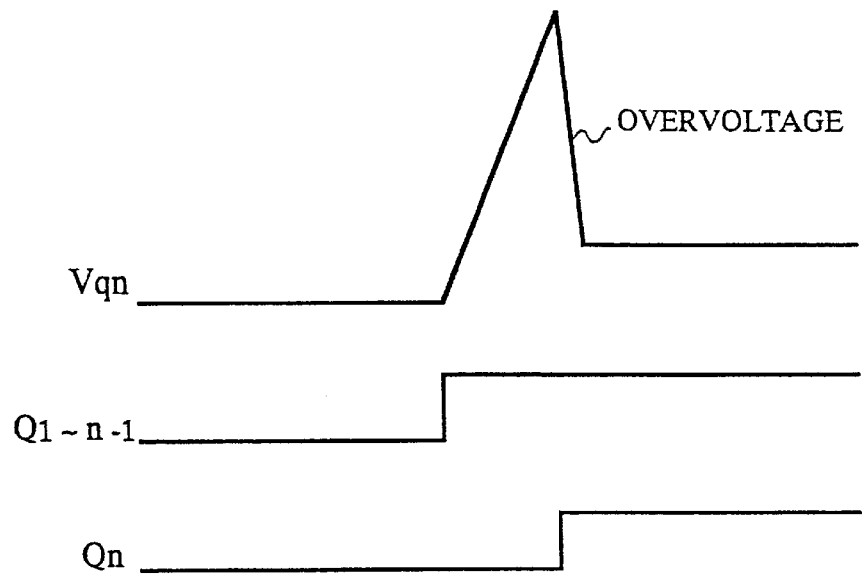
FIG. 9(a) is a timing chart showing an overvoltage generated in a high-speed semiconductor switch due to lack of synchronism among the plurality of high-speed semiconductor switches disposed in each of alplurality of arms of the inverter.
FIG. 9(b) is a timing chart explaining the operation of a snubber circuit, as shown in FIG. 4, connected in parallel to each of the plurality of high-speed semiconductor switches disposed in each of the plurality of arms of the inverter, for absorbing the overvoltage as shown in FIG. 9(a)
Figure 9:
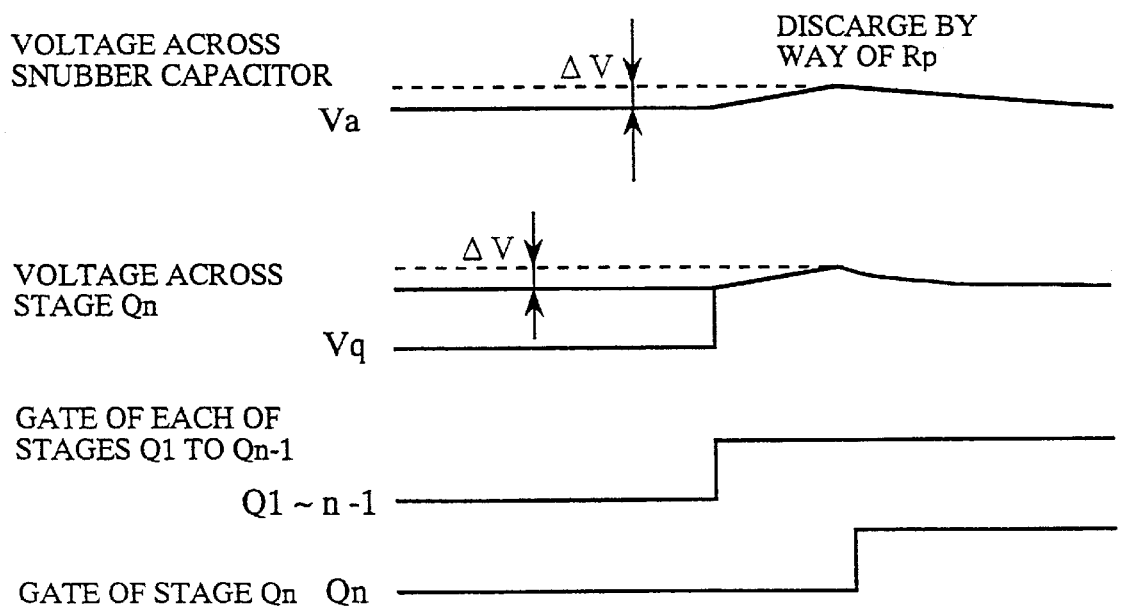

Next, a description will be made as to the operation of the snubber circuit included in each switching stage with reference to FIG. 4. The snubber circuit comprised of the snubber diode 33, the snubber capacitor 34, and the snubber resistor 35 is intended to absorb an overvoltage generated due to lack of synchronism among the plurality of switching stages when they are turned on or off simultaneously. FIGS. 9(a) and 9(b) show the functionality of the snubber circuit. For the detail of the operation and functionality of the snubber circuit, please: refer to Japanese Electric Society Paper Journal Vol. D-113, No. 1.

The product of the capacitance value of the snubber capacitor 34 and the resistance value of the snubber resistor 35 is preset so that it is sufficiently greater than the switching rate at which each of the plurality of arms is switched on. A substantially DC voltage is therefore applied to the snubber capacitor 34. FIG. 9(a) shows the case that each stage does not include the snubber circuit. In this case, when for example only one stage Qn is delayed, an overvoltage appears on the shared voltage Vqn across the stage Qn. FIG. 9(b) shows the case that each stage includes the snubber circuit. In this case, even if one stage Qn is delayed, a slight voltage increase ΔV occurs because the snubber capacitor 34 of the stage absorbs an overvoltage. Such a voltage increase ΔV can be decreased by setting the capacitance value of the snubber capacitor 34 to a larger value. The voltage increase ΔV in the snubber capacitor 34 is discharged by way of the snubber resistor 35 within a period of time during which the inverter does not furnish any output pulse. The voltage of the snubber capacitor 34 thus returns to its original value in a short time. Since the discharge of the snubber capacitor 34 is carried out through the snubber resistor 35 only, an increase in the capacitance value of the snubber capacitor 34 does not increase the loss. In this structure, the snubber resistor 35 serves to equalize the plurality of shared voltages across the plurality of stages as well as to allow the snubber capacitor to become discharged. Even when no voltage increase ΔV occurs on the snubber capacitor 34, the shared voltage is applied to the snubber resistor 35 at all times, and therefore the shared voltage is decreased with a decrease in the resistance value of the snubber resistor 35. As previously explained, the nearer to the output terminal of each arm, the larger shared voltage each switching stage has. Therefore, by decreasing the resistance value of each of the plurality of snubber resistors 35 disposed in each of the plurality of arms as it is nearer to the output terminal of each arm, the uniformity of the plurality of shared voltages across the plurality of switching stages in each arm can be implemented. For example, assuming that the plurality of snubber resistors 35 within the first through twelfth stages are Rp1 through Rp12, the resistance values of those snubber resistors can be set so that the following equations: $Rp6 < Rp5 < Rp4 < Rp3 < Rp2 < Rp1$ and $Rp7 < Rp8 < Rp9 < Rp10 < Rp11$ are established. In this manner, that is, by decreasing the resistance value of each of the plurality of snubber resistors 35 as it are nearer to the output terminal of each arm, the uniformity of the plurality of shared voltages across the plurality of switching stages disposed in each of the plurality of arms can be implemented and hence the reliability of the laser power supply apparatus is improved extensively.

Figure 10:
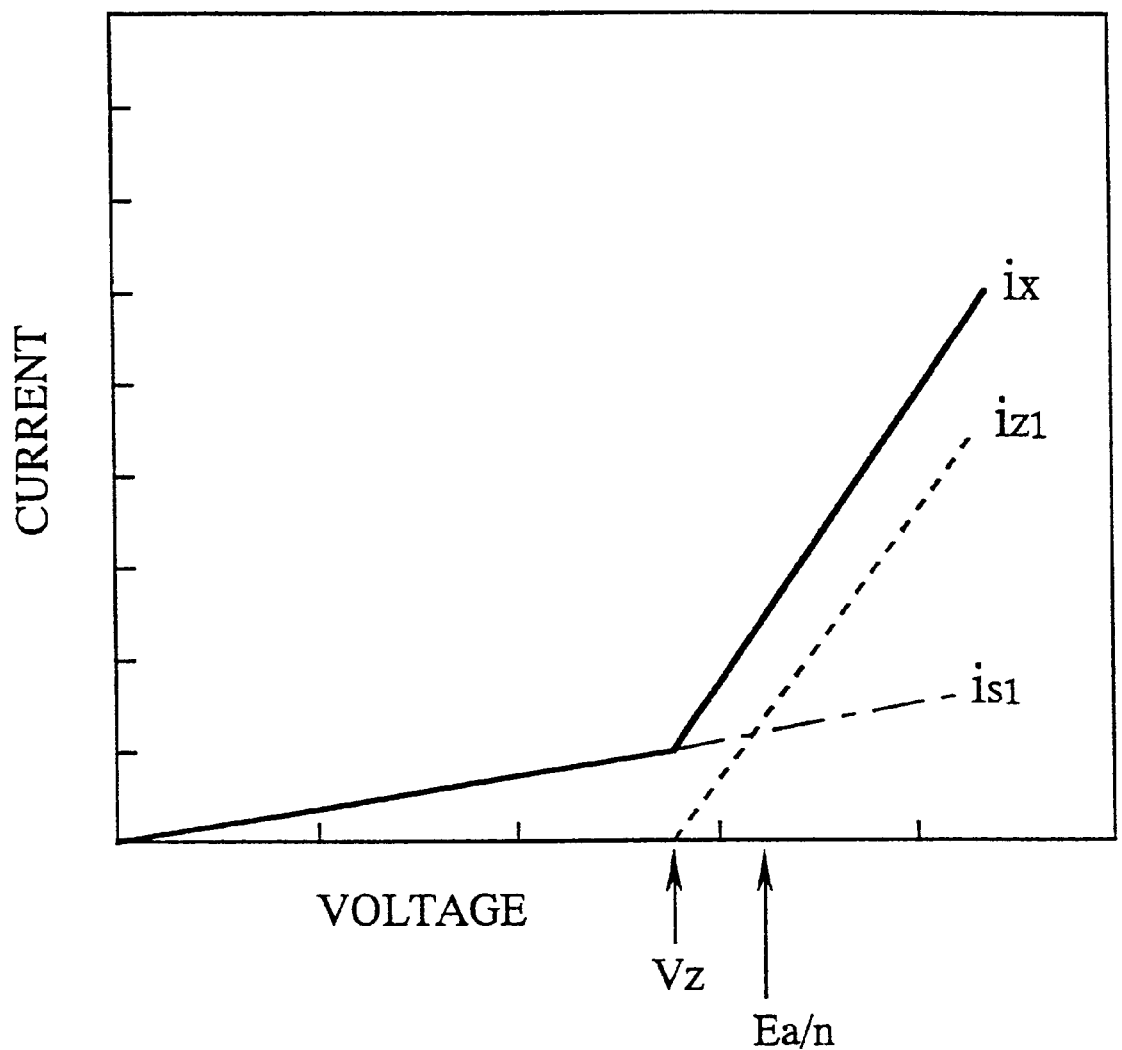
FIG. 10 is a graph explaining the operation of a damper circuit, as shown in FIG. 4, connected to each of the plurality of high-speed semiconductor switches disposed in each of the plurality of arms of the inverter.

The Zener diode 36, the damper gate resistor 37, the clamper resistor 38, and the clamper FET 39, as shown in FIG. 4, form a clamping circuit that serves to limit a maximum value of the voltage across the snubber capacitor 34. As previously mentioned, a current flows into the snubber capacitor 34 to absorb an overvoltage generated due to lack of synchronism among the plurality of switching stages. As a result, the snubber capacitor 34 rises in voltage. The voltage increase is then discharged through the snubber resistor 35. It is therefore needless to say that when the electrical size of the snubber capacitor 34 is relatively small, the voltage across the snubber capacitor 34 returns to its original value and hence to its original state immediately even when the voltage increase on the snubber capacitor 34 is large, because the smaller the electrical size of the snubber capacitor 34 the greater its discharge capability. In other words, when the snubber capacitor 34 has a high degree of discharge capability, the snubber capacitor 34 cannot be brought into a sate in which it is held at a high voltage even if it rises in voltage a number of times and serious lack of synchronism among the plurality of switching stages occurs. This results in preventing a breakdown from occurring in the MOSFET 30. The clamping circuit provides such the functionality. Referring next to FIG. 10, there is illustrated a graph showing the current $i_{s1}$ flowing through the snubber resistor 35, the current $i_{z1}$ flowing through the clamper resistor 38, and the discharge current $i_x$ discharged out of the snubber capacitor 34 at the voltage across the snubber capacitor 34. As previously mentioned, the voltage across the snubber capacitor 34 is an approximately DC voltage. When the snubber capacitor 34 rises in voltage and the zener diode 36 then reaches its breakdown voltage Vz, a voltage is applied to the gate of the clamper FET 39. As a result, a current abruptly starts flowing through a series circuit constructed of the clamper resistor 38 and the damper FET 39 (the damper FET 39 serves as a voltage amplifier), and therefore the discharge current from the snubber capacitor 34 is increased. For example, when the value of the breakdown voltage Vz of the Zener diode 36 is chosen to be slightly smaller than the value of a plurality of equally shared voltages across the plurality of switching stages (i.e. Ea/n, where n is the number of the plurality of switching stages connected in series between both ends of the DC power supply 10), the discharge current suddenly flows out of the snubber capacitor 34 when the snubber capacitor voltage reaches a value that is slightly smaller than (Ea/n). Then, when the snubber capacitor voltage reaches about (Ea/n), the discharge current discharged out of the snubber capacitor 34 reaches a large value. Thus, since when the voltage across each of the plurality of snubber capacitors reaches (Ea/n), the discharge capability of each of the plurality of snubber capacitors 34 is increased, each of the plurality of snubber capacitors 34 cannot be brought into a sate in which it is held at a high voltage even if lack of synchronism among the plurality of switching stages repeatedly occurs a number of times and serious lack of synchronism among the plurality of switching stages occurs. This results in preventing a breakdown from occurring in the MOSFET 30. If serious lack of synchronism among the plurality of switching stages in series occurs, the snubber capacitor 34 will rise in voltage so that it is held at a high voltage. However, since the discharge current from the snubber capacitor 34 increases as the snubber capacitor voltage increases, the snubber capacitor voltage does not rise to a level at which a breakdown can occur in the MOSFET 30. It is clear that how the voltage across the snubber capacitor 34 rises depends on the damper resistor 38. If the resistance value of the clamper resistor 38 is set to zero and the breakdown voltage of the Zener diode 36 is set to (Ea/n), the discharge capability of the snubber capacitor 34 can be surely improved, but the certain voltage (Ea/n) can be applied to the damper FET 39. Therefore, by connecting the damper resistor 38 in series with the damper FET 39, the discharge capability of the snubber capacitor 34 is increased after the snubber capacitor voltage reaches (Ea/n) or more while the withstand voltage of the clamper FET 39 is reduced, thereby improving the reliability of the laser power supply apparatus and reducing costs.

Figure 11:
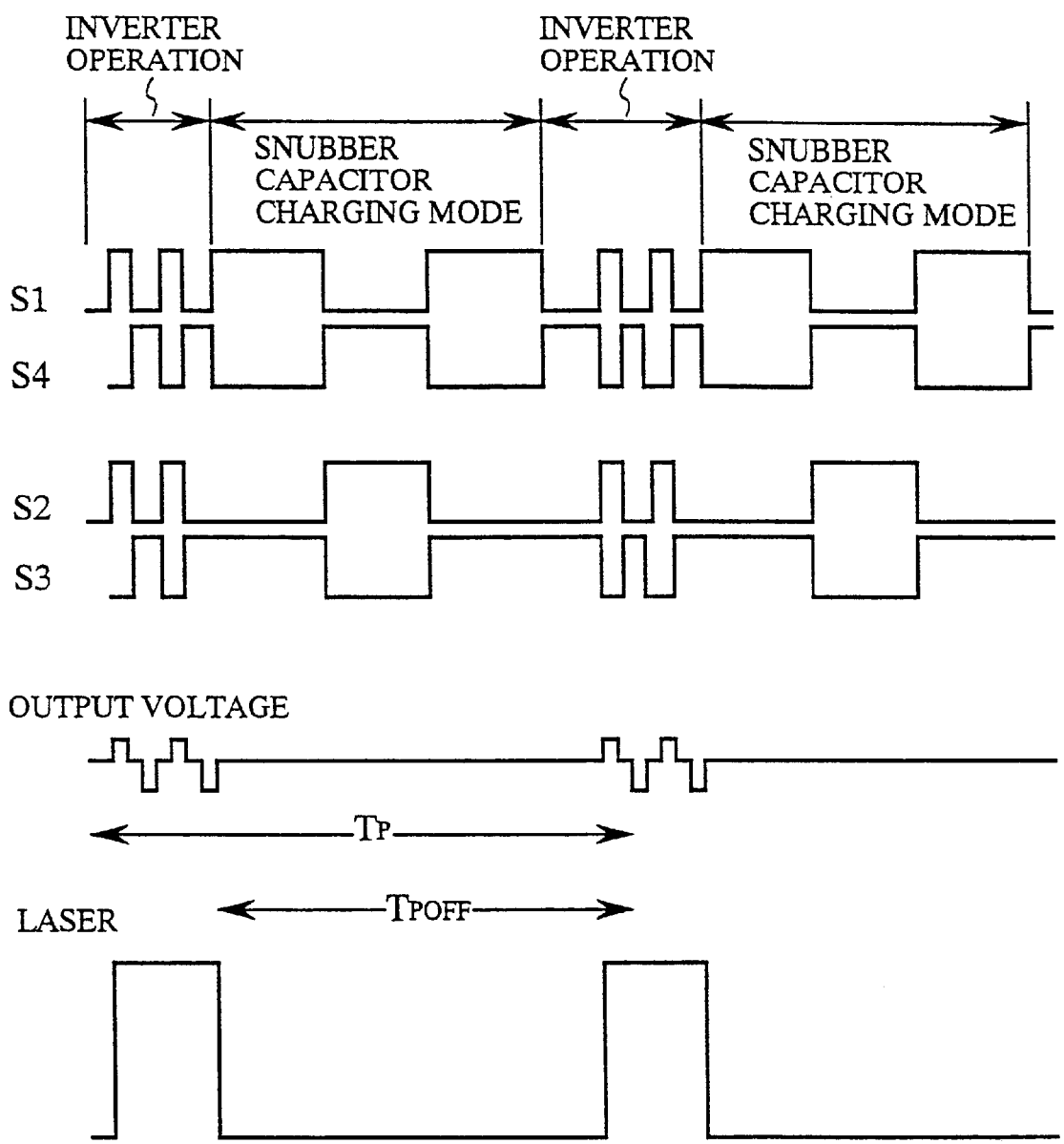
FIG. 11 is a timing chart showing a sequence of charging the snubber circuit as shown in FIG. 4.

As mentioned above, the circuitry as shown in FIG. 4 is so constructed as to absorb an overvoltage generated due to lack of synchronism among the plurality of switching stages in series disposed in each of the plurality of arms and to prevent a breakdown from occurring in the high-speed semiconductor switch 30 within each of the plurality of stages. The snubber capacitor 34 included in each of the plurality of switching stages is charged up to its shared voltage under normal operating conditions. In other words, the snubber capacitor 34 becomes charged to about (Ea/n). Because the capacitance value of the snubber capacitor 34 and the resistance value of the snubber resistor 35 are chosen so that the time constant is sufficiently greater than the pulse repetition period Tp as shown in FIG. 11 in the case that the inverter repeatedly furnishes a series of AC output pulses at a relatively high repetition rate, the voltage across the snubber capacitor 34 is about (Ea/n). In contrast, if the pulse repetition period Tp is greater than the time constant, the voltage across the snubber capacitor 34 becomes lower than (Ea/n). In this case, when the inverter starts the next operations such as causing the upper arm of FIG. 3 to conduct, a large amount current will flow to charge the plurality of snubber capacitors included in the lower arm, which have dropped in voltage. Further, if the pulse repetition period Tp is either extremely long or infinite (in this case, the inverter furnishes only a single pulse), the voltage across the snubber capacitor 34 becomes approximately zero. In this case, the amount of current required to charge the plurality of snubber capacitors included in the lower arm is comparable to the amount of current flowing when the arm is short-circuited. This results in causing a breakdown in the high-speed semiconductor switch 30 within each of the plurality of stages in the lower arm of FIG. 3. FIG. 11 shows a method of preventing a breakdown from occurring in the high-speed semiconductor switch 30. Within a certain time period Tpoff during which the inverter is suspended, the laser control circuit 17 applies a plurality of on/off control signals S1 to S4 to the plurality of gate circuits 14 by way of the optical oscillator 18 to control the plurality of gate circuits 14 so that the pair of high-voltage arms G1 and G3 and the pair of low-voltage arms G2 and G4 as shown in FIG. 1 are alternately switched on at the same time. During the suspending period Tpoff, the inverter does furnish no output pulse. While the pair of high-voltage arms G1 and G3 are simultaneously turned on, the plurality of snubber capacitors 34 disposed in the plurality of stages within each of the pair of low-voltage arms G2 and G4 can become charged. Similarly, while the pair of low-voltage arms G2 and G4 are simultaneously turned on, the plurality of snubber capacitors 34 disposed in the plurality of stages within each of the pair of high-voltage arms G1 and G3 can become charged. Thus, the length of intervals at which the snubber capacitor 34 at each stage becomes charged can be chosen so that it is sufficiently shorter than the discharge time constant of the snubber circuit. In this manner, by providing charging mode in which the snubber circuit 34 within each stage becomes charged within a certain time period Tpoff during which the inverter is suspended, the voltage across the snubber capacitor 34 within each stage can be constantly held at a certain value of about (Ea/n) regardless of the length of the suspending period Tpoff. Thus there is no need to cause a large charge current to flow through the snubber capacitor 34 within each stage, and this results in preventing a breakdown from occurring in the high-speed semiconductor switch 30 within each stage and hence extensively improving the reliability of the laser power supply apparatus.

Figure 12:
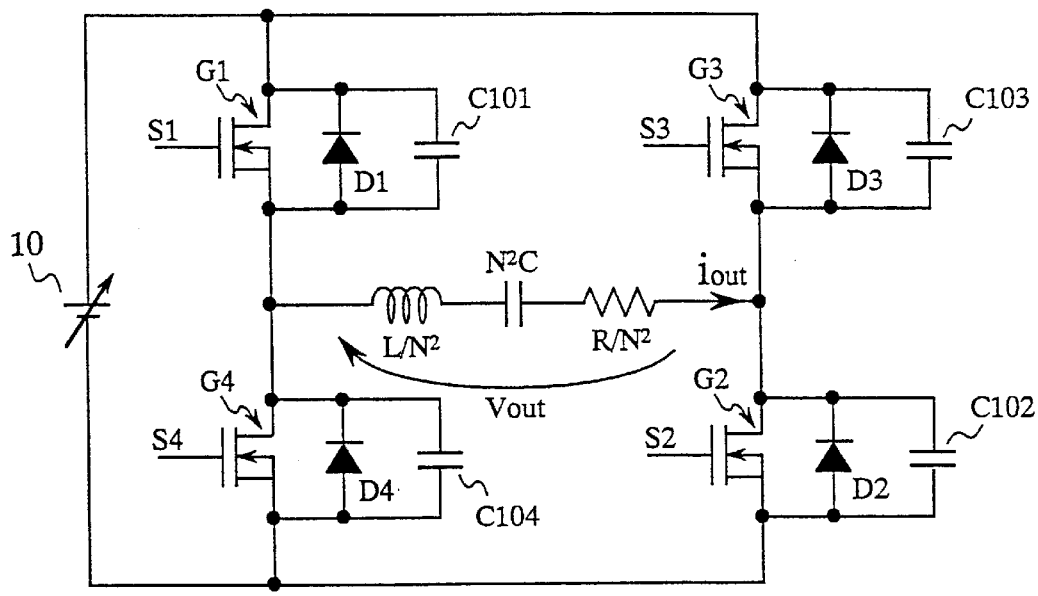
FIG. 12(a) is a schematic circuit diagram of an equivalent circuit of the laser power supply apparatus of the present invention, for showing currents flowing through the plurality of arms of the inverter.
FIG. 12(b) is a timing chart showing the waveforms of on/off control signals applied to the plurality of arms of the inverter, an output voltage and an output current from the inverter, and currents flowing through the plurality of arms.
Figure 12:
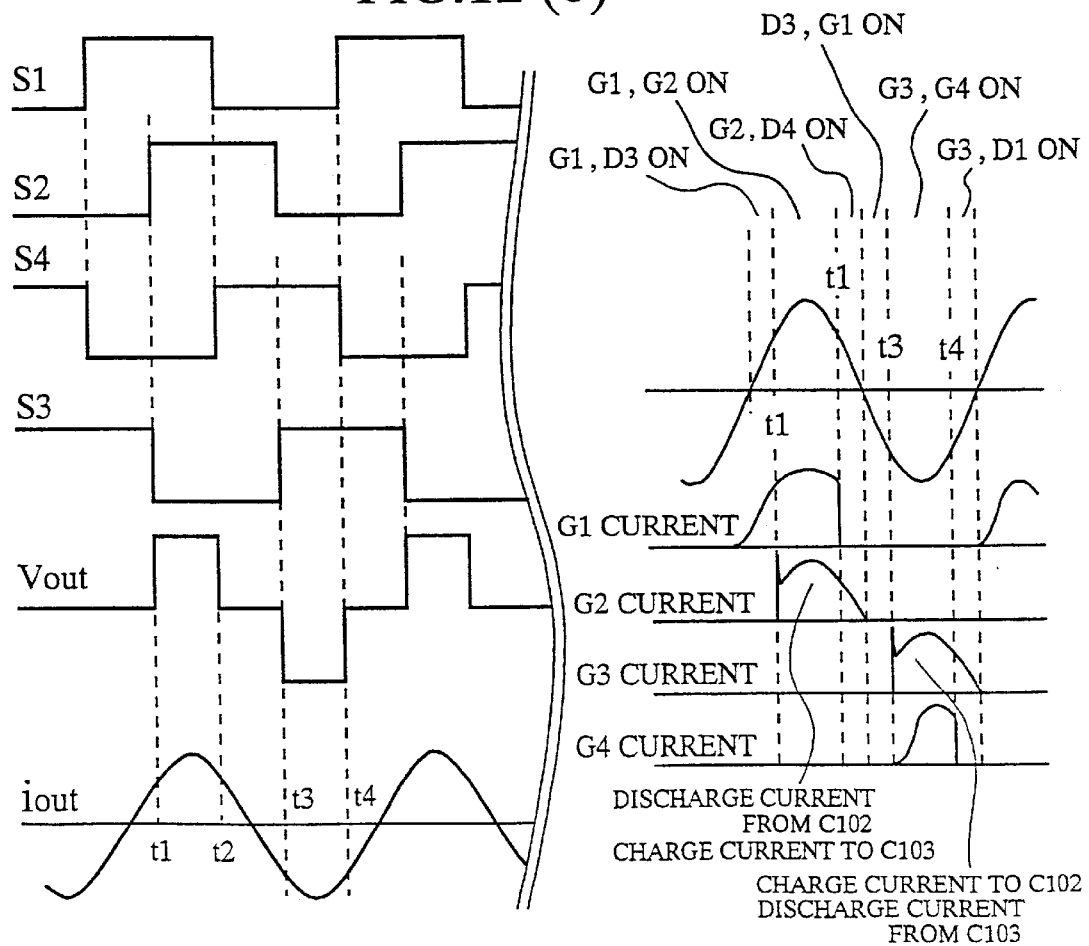

Referring next to FIG. 12(a), there is illustrated a schematic circuit diagram showing an equivalent circuit of the laser power supply apparatus as shown in FIGS. 1 and 2, for explaining currents flowing through each of the plurality of arms. In the figure, the plurality of arms G1 to G4 of FIG. 1 are represented by a plurality of power MOSFETs, respectively. Reference characters D1 to D4 denote circulating diodes, respectively, and C101 to C104 denote equivalent parallel capacitances each including the output capacitance of a corresponding power MOSFET, the capacitances of the plurality of voltage-dividing capacitors 25 respectively connected in parallel to the plurality of switching stages within each of the plurality of arms, stray capacitances between any adjacent two of the plurality of secondary windings 29 of the transformer 24 of FIG. 3, and so on. FIG. 12(b) shows a timingchart showing the waveforms of on/off control signals S1 to S4 respectively applied to the plurality of arms G1 to G4, an output voltage Vout, a load current out, and currents flowing through the plurality of arms G1 to G4. As shown in FIG. 12(b), at time t1, the second arm G2 is brought into conduction. Since both the first arm G1 and the third diode D3 have been being turned on before t1, both a current to charge the third capacitor C103 and a current discharged out of the second capacitor C102 flows through the second switch G2 at the same time that the second arm G2 is turned on. Those currents give rise to a loss of power in the second arm G2. The loss includes a loss due to the switching of the load current and losses caused by charging the third capacitor C103 and discharging the second capacitor C102. Similarly, a similar loss of power is produced in the third switch G3 at time t3.

At time t2, the first arm G1 is turned off. The first capacitor C101 then starts becoming charged gradually with the load current out and simultaneously the fourth capacitor C104 starts discharging charges thereon into the load current out in such a manner that the charging of the first capacitor C101 and the discharging of the fourth capacitor C104 compensate for changes in charges on them with each other. Therefore, no loss is produced in the first arm G1 at that time. Similarly, no loss is produced in the fourth arm G4 at time t4. As mentioned above, in one cycle of the inverting operation, the losses produced in the third and second arms G3 and G2 are greater than those produced in the first and fourth arms G1 and G4, because each of the third and second arms G3 and G2 has to have the load of either charging and discharging the second and third capacitors C102 and C103, or discharging and charging the second and third capacitors C102 and C103, respectively. Such the nonuniformity of the losses produced in the plurality of arms G1 to G4 complicates the design of a cooling mechanism for cooling the plurality of arms G1 to G4.

Figure 13:
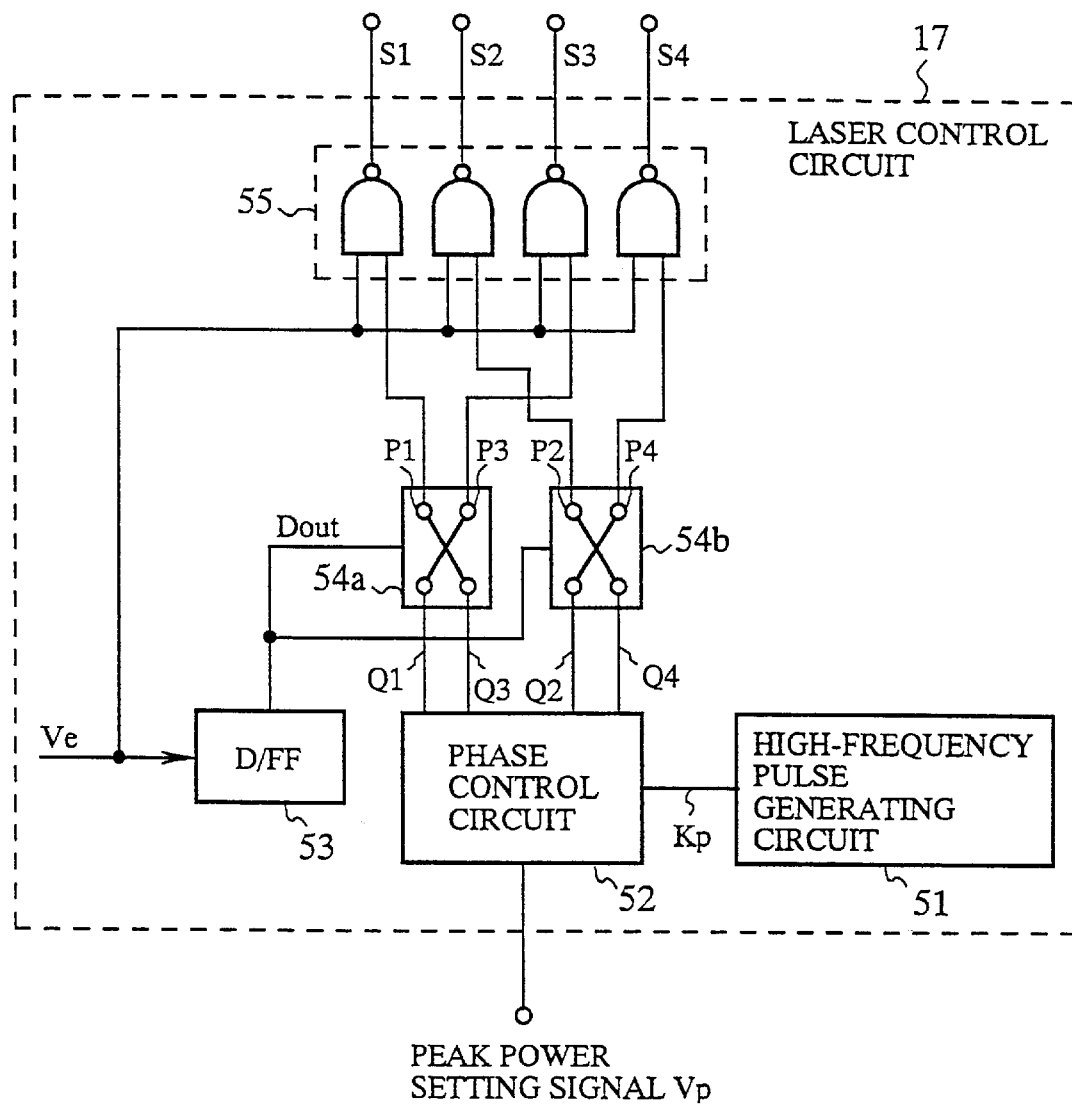
FIG. 13 is a block diagram showing the structure of an example of a laser control circuit, capable of exchanging a pair of on/off control signals with each other and exchanging another pair of on/off control signals to control the plurality of arms that construct the inverter.
Figure 14:
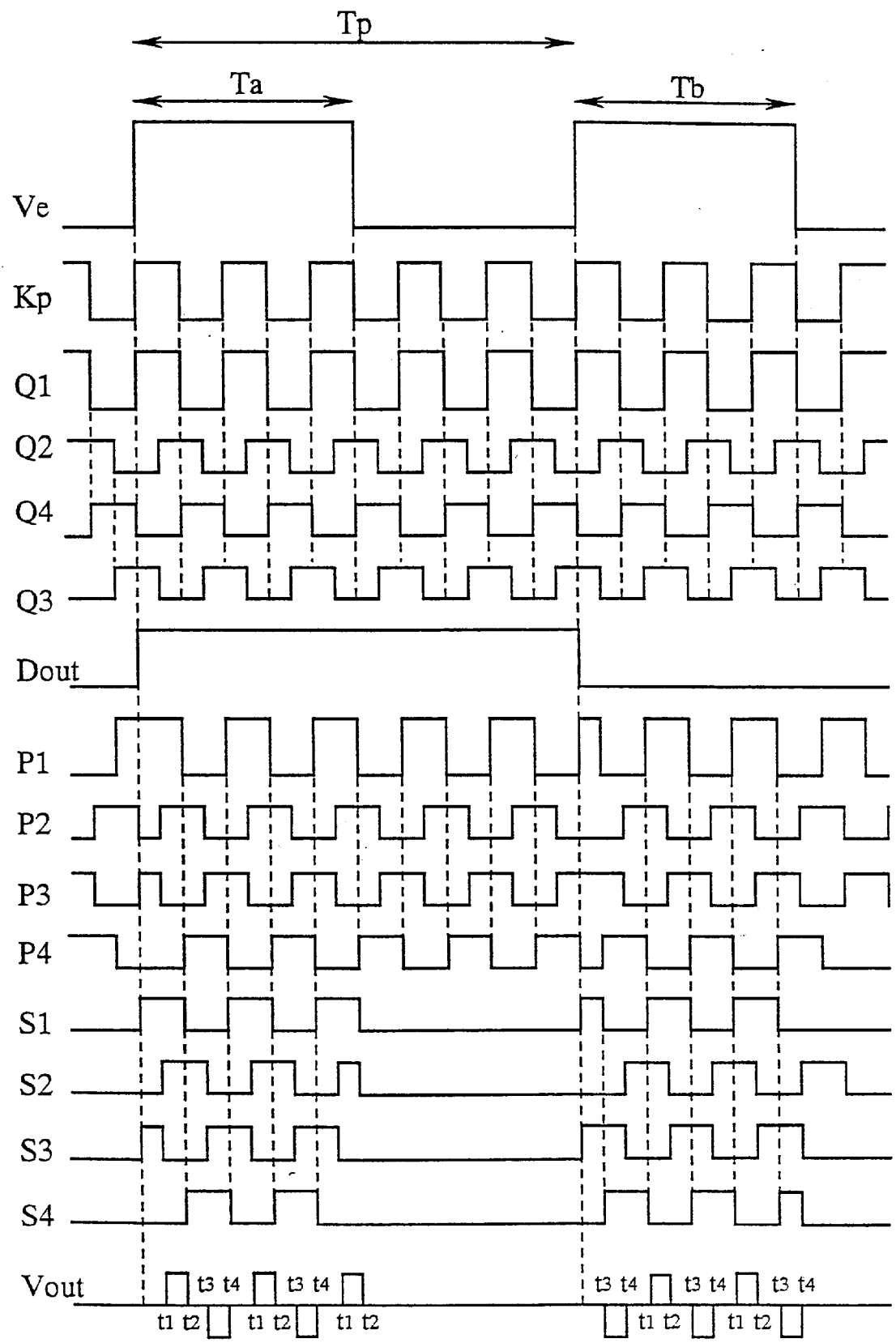
FIG. 14 shows a timing chart showing operations of the laser control circuit of FIG. 13.

Referring next to FIG. 13, there is illustrated a block diagram showing the structure of a main part of an example of the laser control circuit 17, capable of making the losses produced in the plurality of arms G1 to G4 uniform. FIG. 14 shows a timing chart showing operations of the laser control circuit 17. As shown in FIG. 13, the laser control circuit 17 is provided with a high-frequency pulse generating circuit 51, a phase control circuit 52, a D flip-flop 53, a pair of switching units 54a and 54b, and four AND gates 55. The phase control circuit 52 generates four pulses Q1 to Q4 which are out of phase with each other, for determining the pulse widths of output pulses to be furnished by the inverter, from a high-frequency pulse Kp from the high-frequency pulse generating circuit 51 according to the value of the peak power setting signal Vp from outside. The D flip-flop 53 inverts its output Dout to be furnished to the pair of switching units 54a and 54b on the rising edge of a clock pulse Ve applied thereto. Therefore, every time the D flip-flop 53 receives a clock pulse Ve, the first switching unit 54a performs a switching operation so as to alternately furnish the two pulses Q1 and Q3 from the phase control circuit 52 by way of one terminal P1 thereof and furnish the remaining one of the two pulses Q1 and Q3 by way of the other terminal P3 thereof. Similarly, the second switching unit 54 performs a switching operation so as to alternately furnish the two pulses Q2 and Q4 from the phase control circuit 52 by way of one terminal P2 thereof and furnish the remaining one of the two pulses Q2 and Q4 by way of the other terminal P4 thereof every time the D flip-flop 53 receives a clock pulse Ve. The four AND gates 55 implement the logical AND operations on the four outputs from the four terminals P1 to P4 of the pair of switching units 54a and 54b and the clock pulse Ve and furnish their outputs, i.e. on/off control signals S1 to S4 as the logical AND implementations results, respectively. As shown in FIG. 14, every time the D flip-flop 53 of the laser control circuit receives a clock pulse Ve, the first pair of on/off control signals S1 and S3 are exchanged with each other and the second pair of on/off control signals S1 and S3 are exchanged with each other. Thus, within a certain time period Ta during which the clock pulse is at a HIGH level, the second arm G2 is brought into conduction at time t1, as shown in FIG. 12(b), and the third arm G3 is then brought into conduction at time t3. In contrast, within the next time period Tb during which the clock pulse Ve is at a HIGH level, the first arm G1 is brought into conduction at time t1 and the fourth arm G4 is then brought into conduction at time t3. In other words, every time the clock signal Ve makes a LOW to HIGH transition, the first pair of two MOSFETs, i.e. the first pair of high-voltage arms G1 and G3 of FIG. 12(a) alternately have the load of losses caused by charging C4 or C2 and discharging C1 or C3, and the second pair of two MOSFETs, i.e. the second pair of low-voltage arms G4 and G2 alternately have the load of losses caused by charging C1 or C3 and discharging C4 or C2. As a result, the pair of high-voltage arms G1 and G3 equally shares the total losses therein and the pair of low-voltage arms G4 and G2 equally shares the total losses therein. Thus, by interchanging the first pair of on/off control signals for the pair of high-voltage arms G1 and G3 and also interchanging the second pair of on/off control signals for the pair of low-voltage arms G4 and G2 at predetermined intervals, the losses produced in the plurality of arms are equalized and this results in making the design of the mechanism for cooling the plurality of arms much easier.

Figure 15:
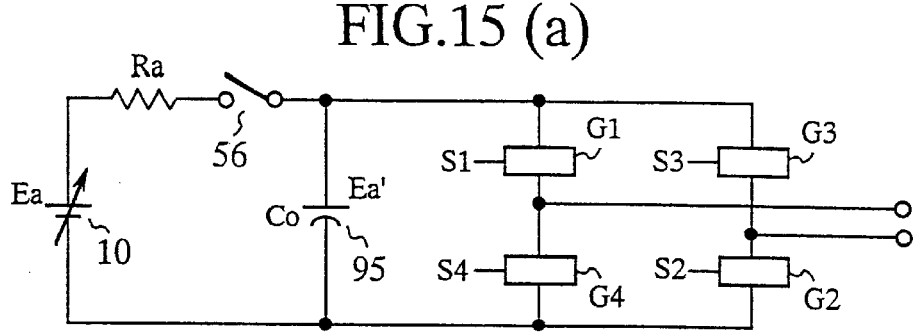
Figure 15:
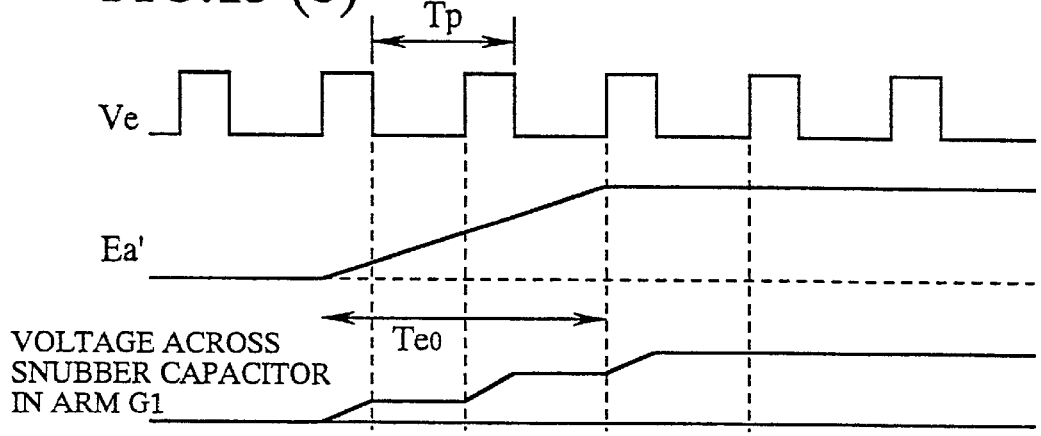
Figure 15:
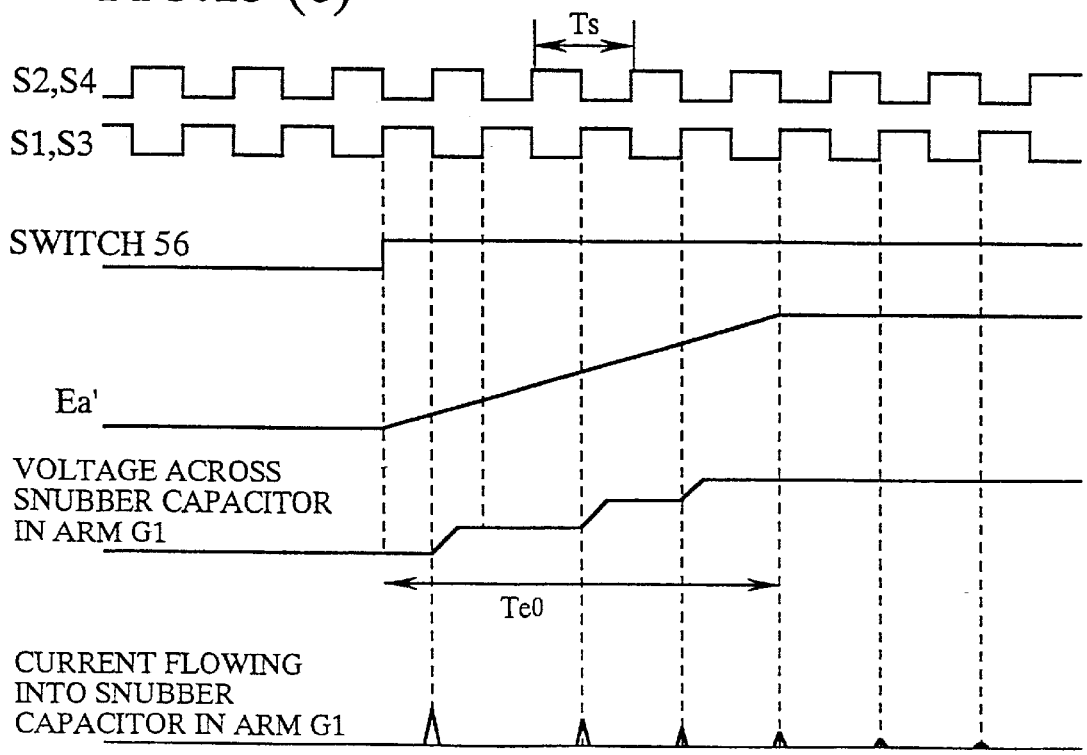

Referring next to FIG. 15(a), there is illustrated a schematic circuit diagram showing the structure of an equivalent circuit of a laser power supply apparatus according to a variant of the aforementioned embodiment of the present invention as shown in FIGS. 1 and 2. The laser power supply apparatus of this variant is intended to prevent an overcurrent caused by abruptly charging the plurality of snubber capacitors in each of four arms G1 to G4 when the DC power supply 10 is powered on, thereby preventing a breakdown from occurring in each of a plurality of high-speed semiconductor switches within each of the four arms. The main part, such as the four arms, of the laser power supply apparatus of this variant is the same as that of the above-mentioned embodiment as shown in FIG. 1 or 2, and therefore the description about the main part of the laser power supply apparatus will be omitted hereinafter. Only a difference between the aforementioned embodiment mentioned above and this variant will be described below.

The laser power supply apparatus as shown in FIG. 15(a) is so constructed as to limit a rising rate at which a voltage applied to the inverter comprised of the four arms G1 to G4 increases after the DC power supply 10 is powered on. A delay circuit comprised of an output impedance Ro of the DC power supply 10 and a smoothing capacitor Co can limit the rising rate at which a voltage Ea' applied to the switching circuit increases after the DC power supply 10 for providing a DC output voltage Ea is powered on, with its time constant Teo (=Ro*Co). As a result, the voltage Ea' applied to the switching circuit rises gradually. FIG. 15(b) shows a timing chart showing a relationship between the pulse repetition period of a clock pulse Ve generated for controlling an on/off sequence of the inverter operations and the time constant Teo of the delay circuit. Within a certain time period during which the clock pulse Ve is at a high level, the pair of high-voltage arms G1 and G3 and the pair of low-voltage arms G2 and G4 are alternately brought into conduction, as shown in FIG. 11. Further, during the time period, the plurality of snubber capacitors within each of the pair of arms forced into conduction become charged. When the time constant Teo is set to be longer than the pulse repetition period Tp of the clock pulse Ve, as shown in FIG. 15(b), it requires much time, i.e. several periods to charge the plurality of snubber capacitors. This results in preventing an overcurrent due to abruptly charging of the plurality of snubber capacitors after the inverter comprised is powered on, thereby preventing a breakdown from occurring in each of the plurality of high-speed semiconductor switches disposed in each of the plurality of arms.

FIG. 15(c) shows a relationship between the pulse repetition period Ts of on/off control signals S1 to S4 applied to the four arms in charging mode in which the plurality of snubber capacitors disposed in each of the plurality of arms become charged within a period of time during which the inverter operation is suspended, as shown in FIG. 11, and the time constant Teo of the delay circuit, i.e. the delay time of the voltage Ea' applied to the switching circuit comprised of the four arms. By setting the delay time of the voltage Ea' to be longer than the pulse repetition period Ts of the on/off control signals S1 to S4 generated in charging mode, the plurality of snubber capacitors become charged gradually over several time periods of the on/off control pulse. In accordance with this method, since the inverter can start operating after the voltage applied to the inverter reaches a normal value, the inverter is prevented from furnishing an incomplete output immediately after the inverter is powered on.

Figure 16:
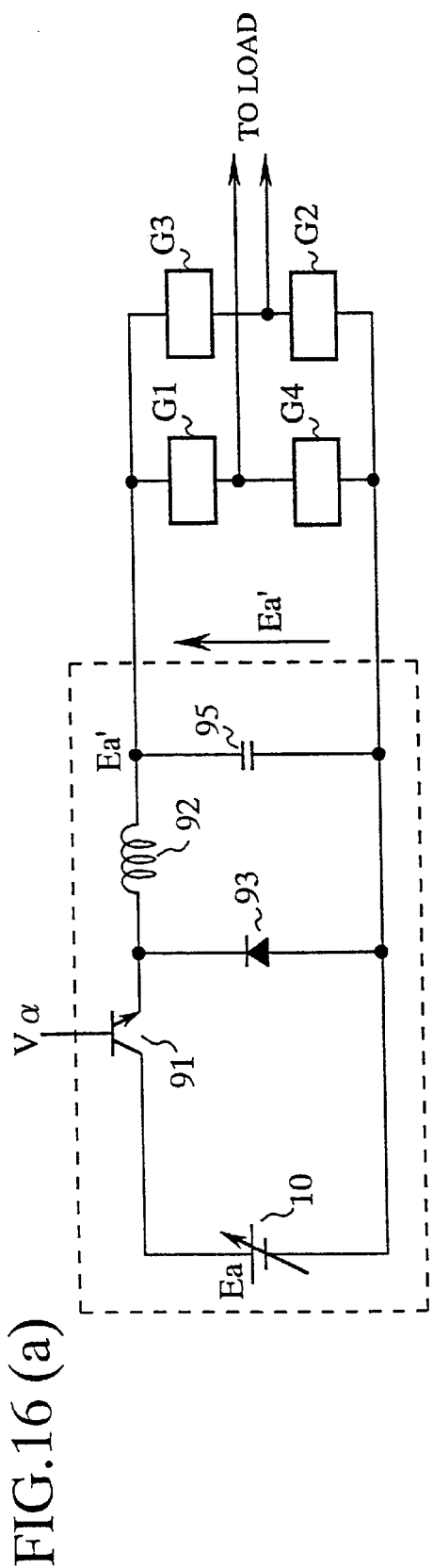
Figure 16:
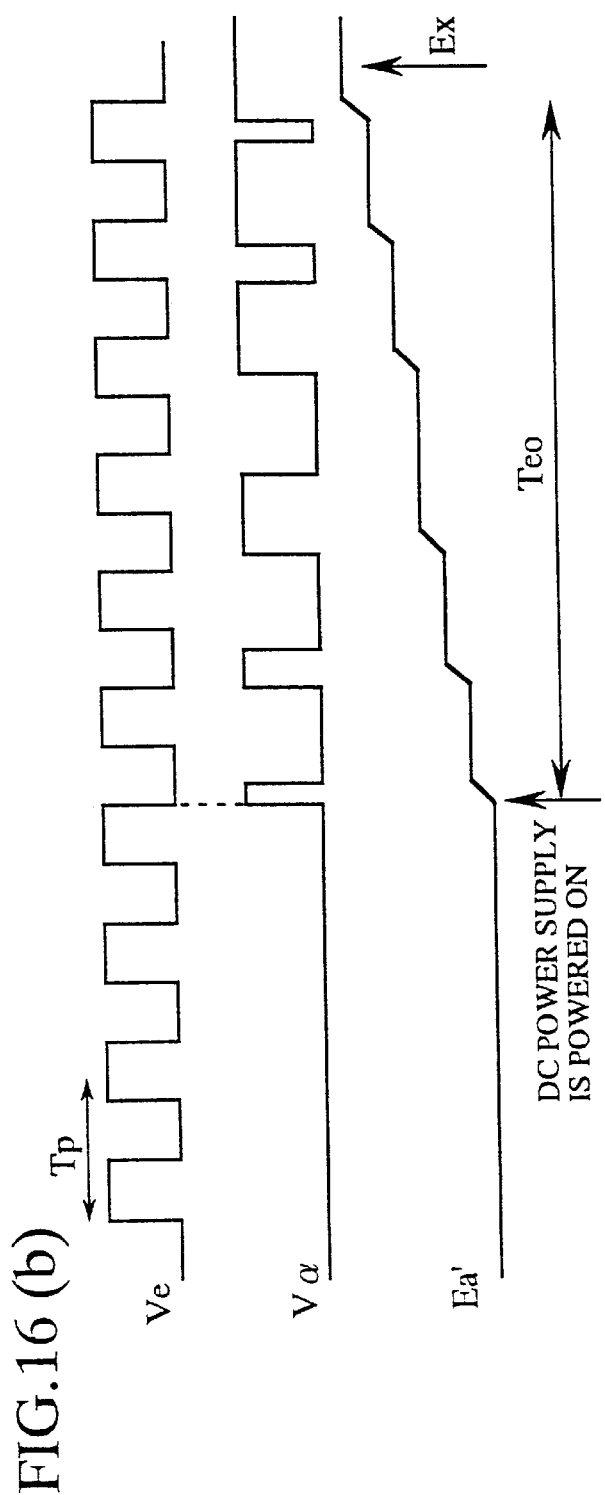

Referring next to FIG. 16(a), there is illustrated a block diagram showing another method of delaying the appliance of the voltage Ea' to the switching circuit comprised of the four arms G1 to G4 when the laser power supply apparatus is powered on. In accordance with the other method, there is provided a control transistor 91 for applying the DC output voltage from the DC power supply 10 to a voltage smoothing circuit comprised of a smoothing reactor 92, an output capacitor 95, and a circulating diode 93. The control transistor 91 is intermittently controlled by a control signal Vα synchronized with a clock pulse Ve generated for controlling the inverter. The duty cycle of the control signal Vα, i.e. the ratio of pulse duration during which the transistor 91 is to be turned on to pulse spacing, is increased so as to make the voltage across the output capacitor 95 rise gradually over a period of time Teo after the laser power supply apparatus is powered on. By setting the time period Teo during which the output capacitor 95 rises in voltage to be longer than the pulse repetition period Tp of the clock pulse Ve, the plurality of snubber capacitors become charged gradually over several time periods of the clock pulse Ve. In addition, when the laser power supply apparatus is powered on, the plurality of on/off control signals S1 to S4 to be applied to the inverter can be generated in charging mode in which the plurality of snubber capacitors disposed in each of the plurality of arms become charged, as shown in FIG. 11, and the time period Teo during which the output capacitor 95 rises in voltage can be set to be longer than the pulse repetition period Ts of the on/off control signals S1 to S4 generated in charging mode.

As previously mentioned, either of the above-mentioned methods makes it possible to cause the plurality of snubber capacitors within each of the four arms to become charged gradually over several time periods of the clock pulse Ve by generating and applying a DC voltage that rises gradually to the inverter while limiting the rising rate of the DC output voltage of the DC power supply, and by setting the time period Teo during which the generated DC voltage rises in voltage to be longer than either the pulse repetition period Tp of the clock pulse Ve or the pulse repetition period Ts of the on/off control signals generated in charging mode for charging the snubber capacitors. This results in preventing an overcurrent caused by abruptly charging the plurality of snubber capacitors in each of the four arms, thereby preventing a breakdown from occurring in each of the plurality of high-speed semiconductor switches within each of the four arms.

Figure 18:
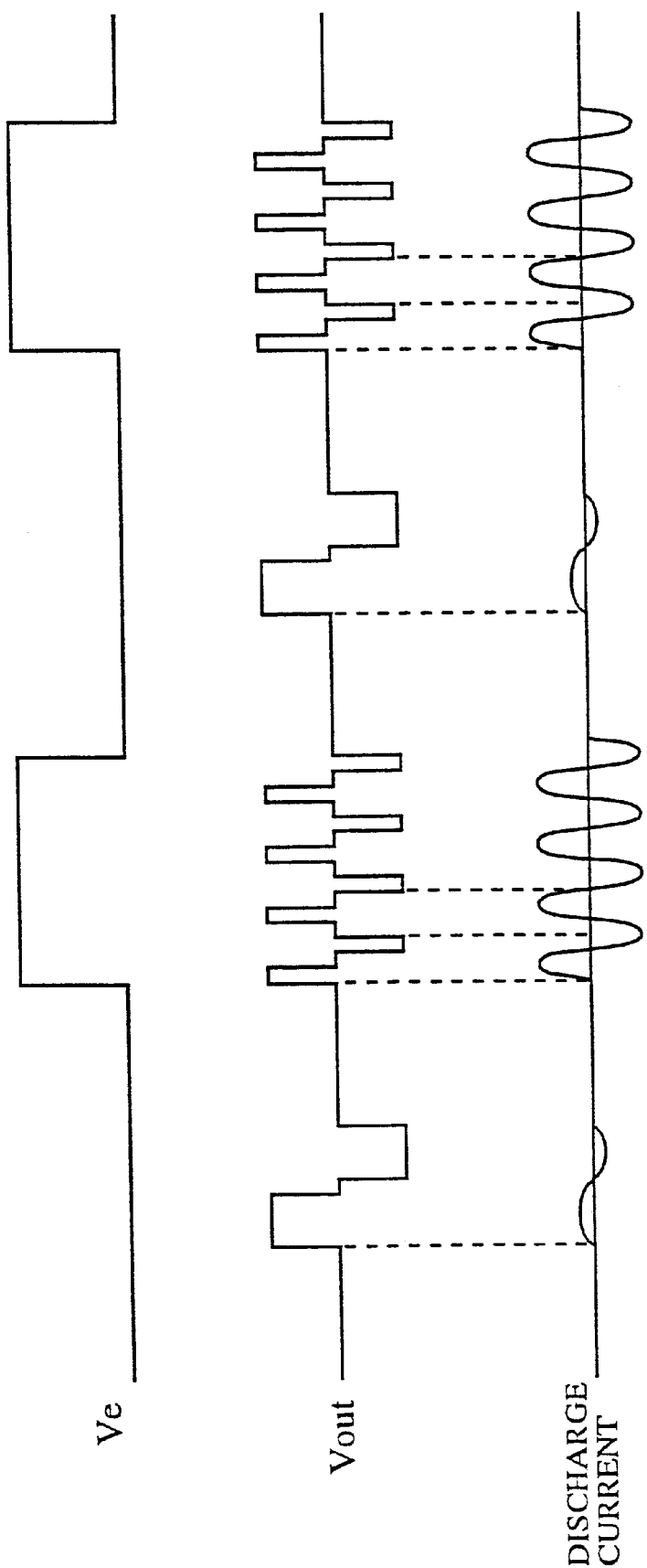
FIG. 18 is a timing chart showing the waveforms of an output voltage and a discharge current from the inverter of a laser power supply apparatus according another variant of the embodiments of FIGS. 1 and 2.

Referring next to FIGS. 17 and 18, there are illustrated timing diagrams showing the waveforms of the clock pulse Ve, the output voltage Vout of the inverter, and the discharge current out, generated using methods of improving the stability of laser power according to the present invention. As the length Tp of intervals at which the gas in the laser device discharges increases, fewer ions and electrons reside in the discharge space after the gas has discharged. Therefore, it becomes difficult to cause a high-frequency discharge, and the amount of electrical power supplied to the discharge space is varied. As a result, the laser power is varied. In general, a pre-discharge is carried out slightly before the main discharge is done. FIG. 19 shows such a pre-discharge method. In a prior art structure using a transformer, the frequency of the pre-discharge must be equal to or greater than the frequency of the main discharge from the viewpoint of the magnetic flux of the transformer. There is therefore a need to continue to apply a voltage to the discharge space as long as possible to make sure the discharge occurs in the discharge space. FIG. 17 shows a method of improving the stability of the laser power, comprising the steps of reducing the frequency of the pre-discharge to be done immediately before the main discharge, and increasing the pulse duration of the output voltage Vout of the inverter applied to the discharge space. In accordance with the method, the amount of discharge current increases gradually. A transition from the pre-discharge to the main discharge will be made after the discharge has grown sufficiently. The amount of electrical power per pulse applied to the discharge space when producing the main discharge is thus constant regardless of the length of the repetition period Tp of the main discharge. In this case, the laser power is stabilized. FIG. 18 shows another method of improving the stability of the laser power, comprising the step of producing a continuous discharge within a certain period of time during which the inverter is suspended. In accordance with the other method, the discharge space continues to discharge during the continuous discharge. During the continuous discharge, a number of ions and electrons reside in the discharge space at all times. This thus results in ensuring that the main discharge occurs. In this case, the laser power is stabilized in a way similar to the above-mentioned method. In the example of FIG. 18, the frequency of the continuous discharge is set to be lower than that of the main discharge to ensure that the main discharge occurs. In this manner, immediately before the inverter of the present invention generates an AC output having an arbitrary pulse width so as to cause the main discharge, it can generate another AC output having a frequency different from that of the former AC output so as to cause a pre-discharge. Alternately, within a period of time during which the inverter operation is suspended, the inverter can generate another AC output having a frequency different from that of the AC output generated to cause the main discharge, so as to generate a continuous discharge. Accordingly, either of the methods mentioned above makes it possible to cause the main discharge to occur with stability and to cause the laser device to radiate laser light having a stable intensity.

Figure 20:
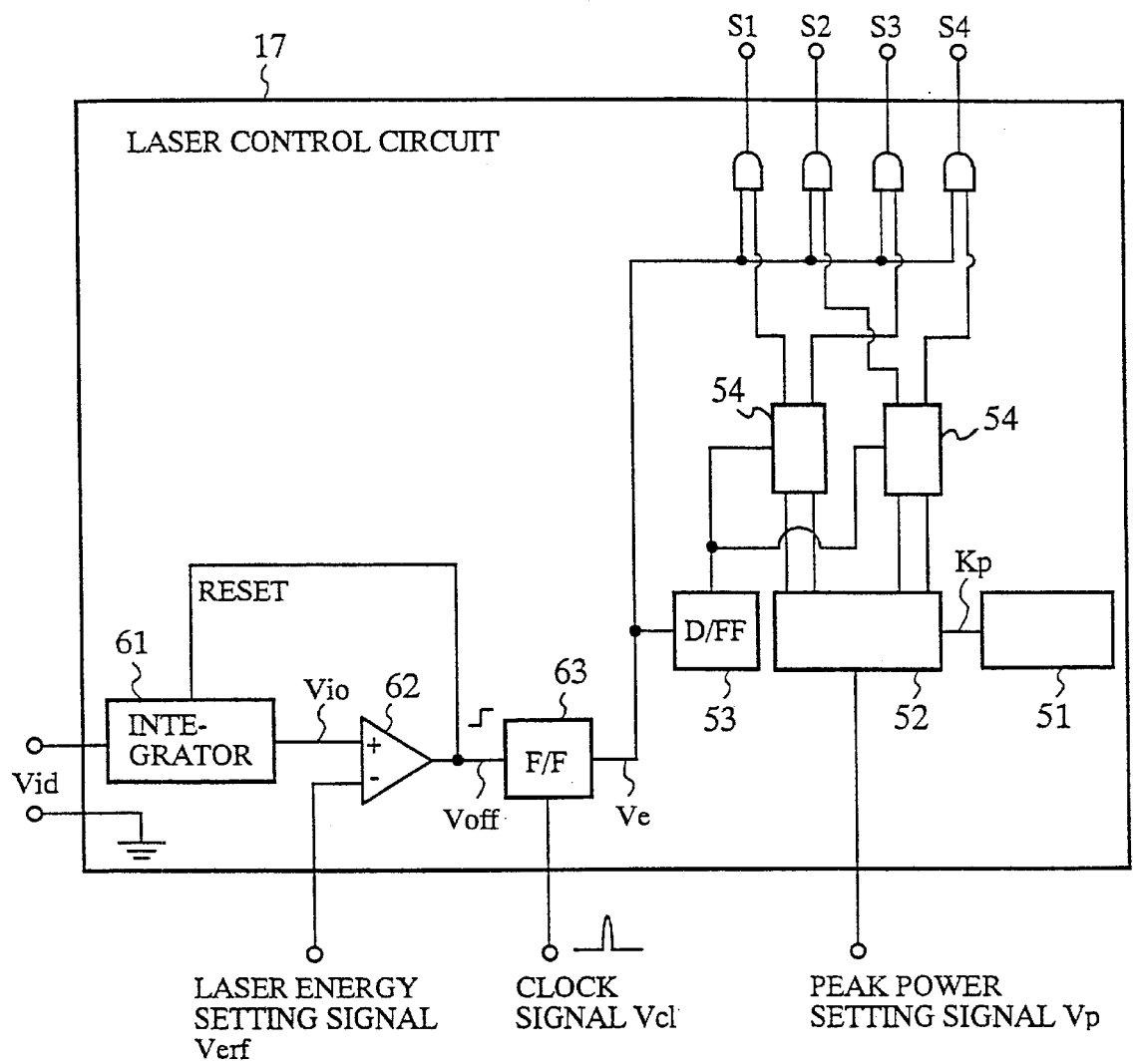
FIG. 20(a) is a schematic circuit diagram showing the structure of a laser control circuit of the laser power supply apparatus of FIG. 1.
FIG. 20(b) is a timing chart showing operations of the laser control circuit of FIG. 20(a)
Figure 20:
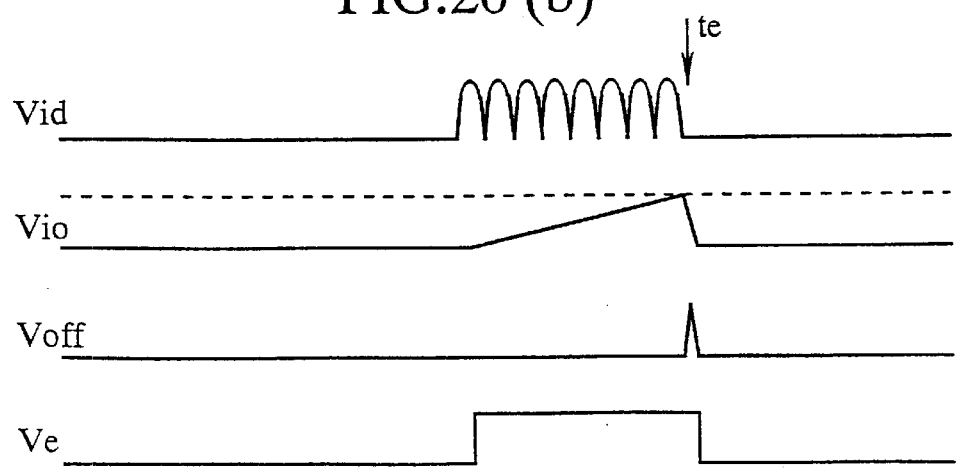
Figure 21:
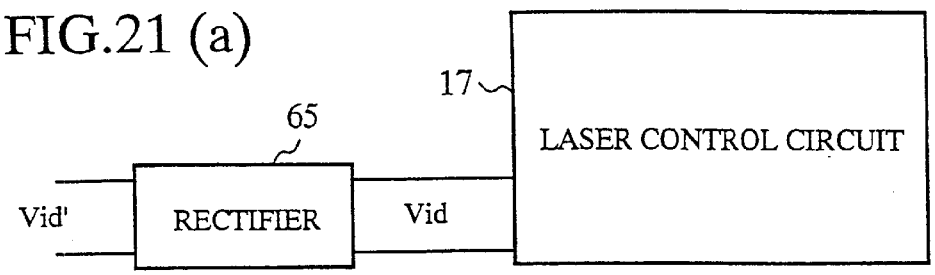
FIG. 21(a) is a schematic circuit diagram showing the structure of a laser control circuit of the laser power supply apparatus of FIG. 2.
FIG. 21(b) is a timing chart showing operations of the laser control circuit of FIG. 21(a)
Figure 21:
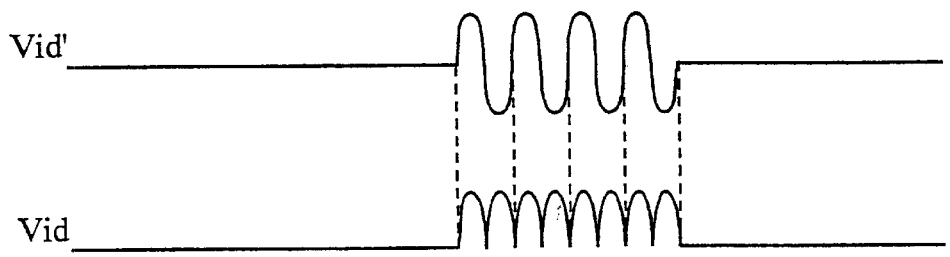

Referring next to FIG. 20($a$), there is illustrated a schematic circuit diagram showing the structure of the laser control circuit 17 of FIG. 1. When the current detector 19 of FIG. 1 detects the current flowing from the DC power supply to the load by way of the plurality of arms, it furnishes a signal Vid representing the current to an integrator 61 of the laser control circuit 17. The integrator 61 integrates the signal Vid from the current detector 19 and then furnishes the integration result vio to a comparator 62. The comparator 62 compares the output Vio of the integrator 61 with a laser energy setting voltage Vref. The output Vio of the integrator 61 approximately represents the amount of discharge energy. When the amount of discharge energy reaches a predetermined value indicated by the laser energy setting voltage Vref at time te, the comparator 62 furnishes an output Voff at a HIGH level, as shown in FIG. 20($b$). After a flip-flop 63 receives the output Voff at a HIGH level from the comparator 62, it causes an on/off clock pulse Ve, which has been caused to go HIGH in response to a clock signal Vcl applied thereto from outside the laser power supply apparatus, to make a HIGH to LOW transition. As a result, the discharge is suspended and hence the laser operation is suspended at time te. Since the laser control circuit 17 of FIG. 1 is so constructed as to stop the discharge when the integration of the current flowing from the DC power supply reaches a predetermined value, as mentioned above, it can supply a predetermined amount of discharge energy that is proportional to the laser energy setting signal Vref to the discharge space in the laser device, so that the laser device can generate stable laser power. Accordingly, even though the discharge becomes unstable, the amount of discharge energy included in each pulse is maintained constant and the laser power is therefore maintained constant. In a laser power supply apparatus according to another embodiment of the present invention as shown in FIG. 2, the current detector 19 is so disposed as to directly detect the discharge current flowing through the laser device. In this case, a rectifier 65 is needed to rectify the discharge current Vid' detected by the current detector 19, as shown in FIGS. 2, and 21($a$) and 21($b$), because the discharge current is an alternating current. The discharge current rectified Vid is then applied to the laser control circuit 64. This direct detection of the discharge current makes it possible to supply a more accurate amount of discharge energy, which does not include losses produced in the inverter, into the discharge space.

Figure 22:
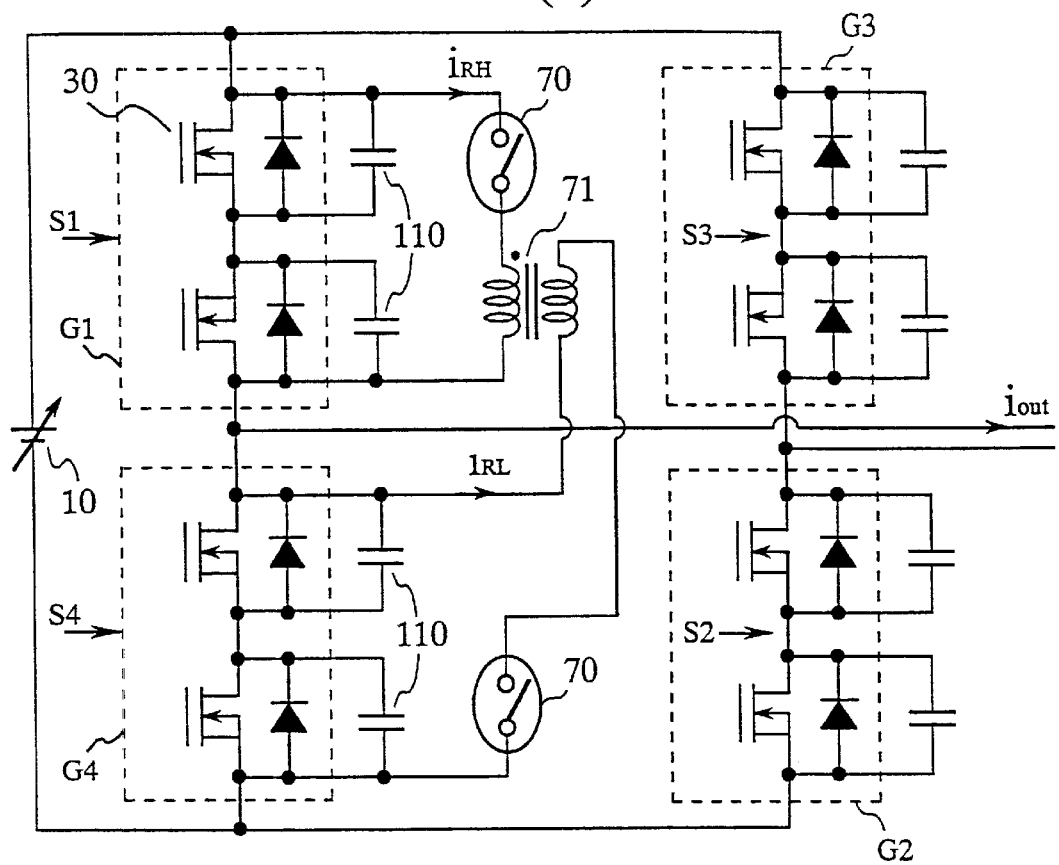
FIG. 22(a) is a schematic circuit diagram showing the structure of a laser power supply apparatus provided with an example of a mechanism for reducing losses produced in the inverter, according to a variant of the embodiments of the present invention of FIGS. 1 and 2.
FIG. 22(b) is a timing chart showing operations of the laser power supply apparatus of FIG. 22(a)
Figure 22:
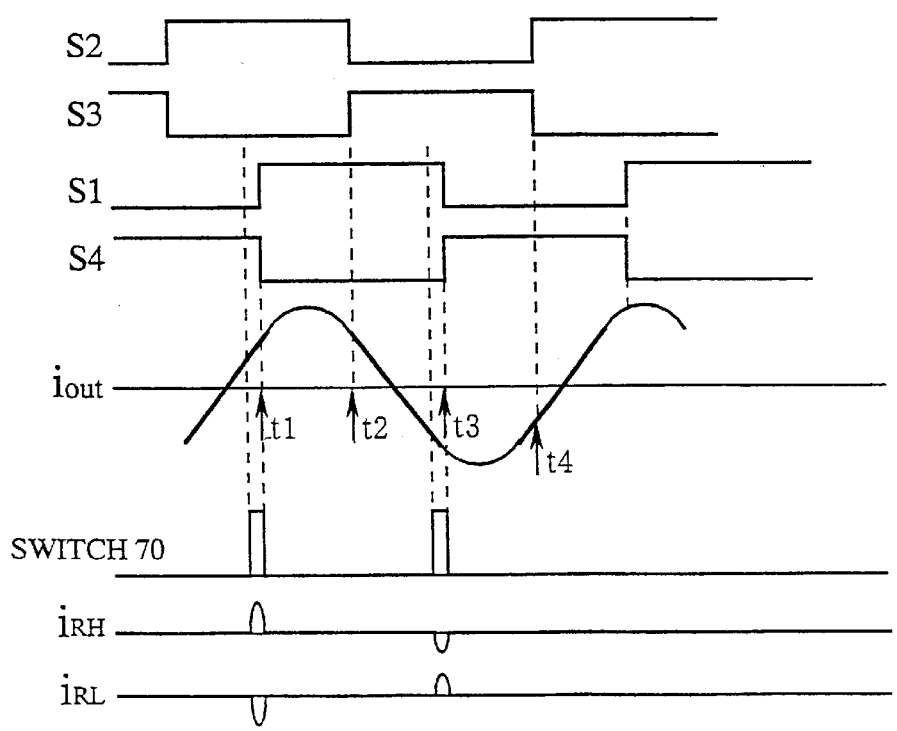

Referring next to FIG. 22($a$), there is illustrated a schematic circuit diagram showing the structure of a laser power supply apparatus according to a variant of the exemplary embodiment mentioned above of the present invention as shown in FIGS. 1 and 2. The main part, such as the four arms, of the laser power supply apparatus of this variant is the same as that of the above-mentioned embodiment as shown in FIGS. 1 and 2, and therefore the description about the main part of the laser power supply apparatus will be omitted hereinafter. Only a difference between the aforementioned embodiment mentioned above and this variant will be described below.

This laser power supply apparatus has a mechanism for reducing losses produced in the inverter. As shown in FIG. 22($a$), the first arm G1 includes a recovery switch 70 and one of a pair of reactors 71 in series connected between both ends of the first arm G1, and the fourth arm G4 also includes a recovery switch 70 and the other one of the pair of reactors 71 in series connected between both ends of the fourth arm G4, the pair of reactors 71 being coupled together by magnetic induction. As previously mentioned, at time t1 and t3, a charging or discharging loss can be produced in the capacitance 110 connected in parallel to each of the plurality of high-speed semiconductor switch 30 within each of the four arms. The laser power supply apparatus of FIG. 22(a) is so constructed as to reduce such charging and discharging losses in the capacitance 110. As shown in FIG. 22(b), the two recovery switches 70 are switched on immediately before time t1. As a result, a charge stored on the capacitance 110 of the first arm G1 is transferred, by way of the pair of reactors 71, to the capacitance 110 of the fourth arm G4. When the transfer is completed, the two recovery switches 70 are switched off and the first arm G1 is then switched on. As a result, when the first arm G1 is turned on, no current for charging the plurality of capacitances 110 of the fourth arm G4 flows through the first arm G1 and no current discharged out of the plurality of capacitances 110 of the first arm G1 flows through the first arm G1. Instead, the charges stored on the capacitances 110 of the first arm G1 are transferred to the capacitances 110 of the fourth arm G4 before the first arm G1 is turned on. Therefore, no losses are produced in the first arm G1. Similarly, no losses are produced in the fourth arm G4 at time t3. As a result, the losses produced in the inverter can be reduced and therefore the efficiency of the laser power supply can be increased. When the laser power supply apparatus is constructed in such a way that losses are produced in the third arm G3 and the second arm G2 at time t1 and t3, respectively, the third arm G3 includes a recovery switch and a reactor in series connected between both ends of the third arm, and the second arm G2 includes a recovery switch and a reactor in series connected between both ends of the second arm, those reactors being coupled together by magnetic induction. This variant can offer the same advantage.

Figure 23:
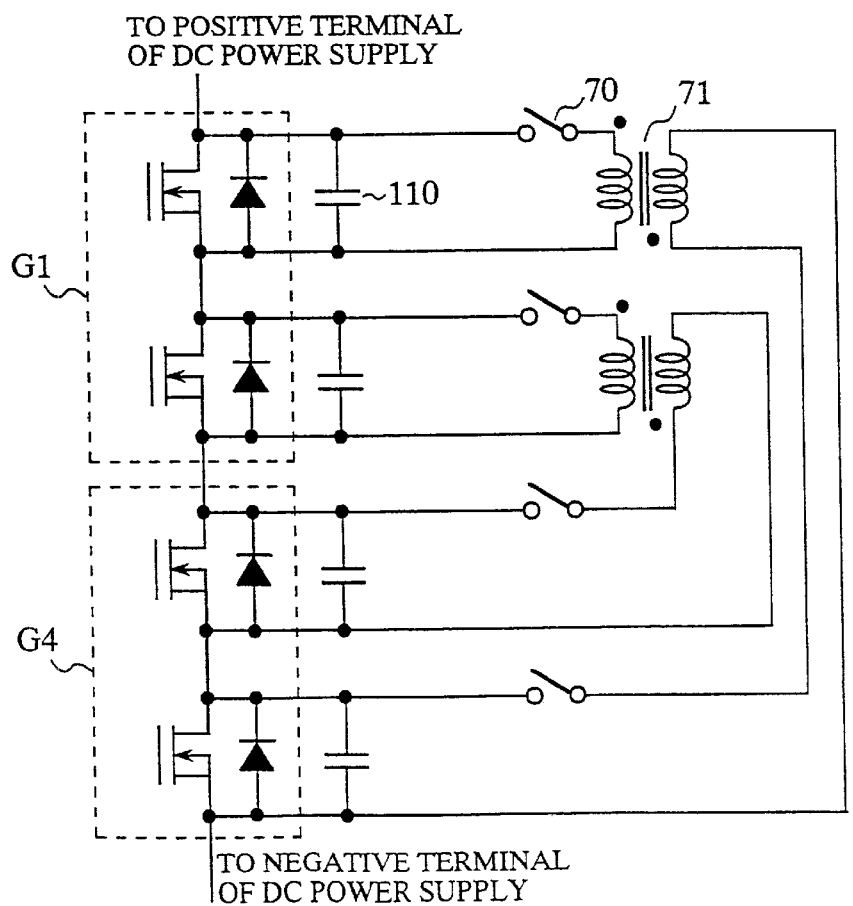
FIG. 23 is a schematic circuit diagram showing the structure of a laser power supply apparatus provided with another example of the mechanism for reducing losses produced in the inverter, according to another variant of the embodiments of the present invention of FIGS. 1 and 2.

Referring next to FIG. 23, there is illustrated a schematic circuit diagram showing the structure of another example of the inverter that is so constructed as to reduce losses produced in the inverter. As previously mentioned, immediately before one arm is turned on, the inverter of FIG. 22 can transfer charges stored on the plurality of capacitances 110 of the arm to the plurality of capacitances 110 of another corresponding arm by way of a pair of switches 70. Therefore, each of the two switches 70 needs to have a large withstand voltage. In contrast, the inverter of FIG. 23 has a plurality of switches 70 for all stages within each of the pair of arms, e.g. G1 and G4, respectively. Therefore, even when the withstand voltage of each of the plurality of switches 70 is low, the charges on the plurality of capacitances 110 can be transferred between the pair of arms with efficiency.

Figure 24:
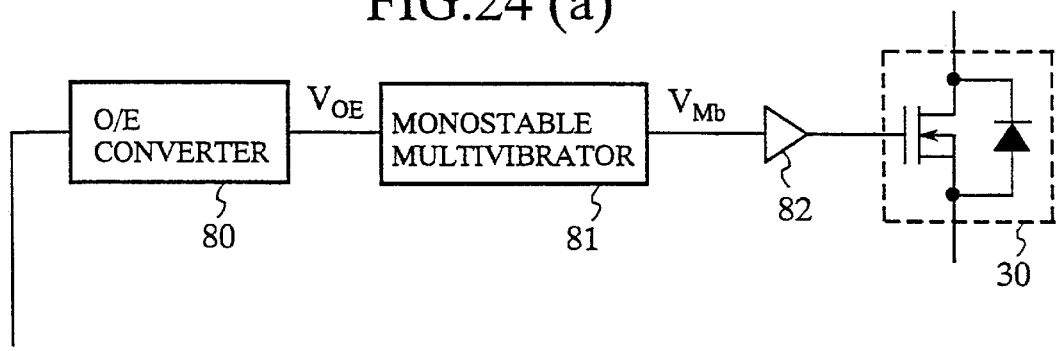
FIG. 24 is a block diagram showing the structure of each of a plurality of drive circuits as shown in FIGS. 1 and 2.
Figure 24:
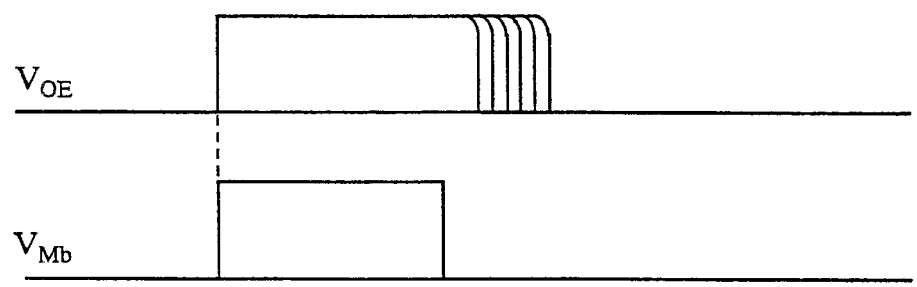

Referring next to FIG. 24, there is illustrated a block diagram showing the structure of each of the plurality of drive circuits 26 of FIG. 3 disposed in each of the plurality of arms. In general, O/E converters cause jitter, i.e. variations in the switching timing, that is not negligible when input signals have quickly rising and falling edges. The falling edges of outputs of an O/E converter can have larger jitter. The jitter is caused by the storage time of optical transistors disposed within the O/E converter. Large jitter can cause lack of synchronism among the plurality of stages in series within each of the plurality of arms of the inverter, and hence an overvoltage in the plurality of stages in series. The structure as shown in FIG. 24(a) is intended to prevent the occurrence of lack of synchronism among the plurality of stages in series within each of the plurality of arms of the inverter which is caused by such jitter. Each of the plurality of drive circuits 26 has a monostable multivibrator 81 disposed at the back of an O/E converter 80, for generating a on/off control signal $V_{Mb}$ having a certain pulse width in response to an output $V_{OE}$ from the O/E converter 80, as shown in FIG. 24(b). As a result, a corresponding high-speed semiconductor switch 30 can be brought into conduction only within a certain period of time regardless of the amount of jitter of the falling edge of the output of the O/E converter 80. Lack of synchronism among the plurality of stages in series is therefore eliminated, thereby preventing the occurrence of an overvoltage in the plurality of stages in series. Thus the laser power supply apparatus can operate with a high degree of reliability.

Figure 25:
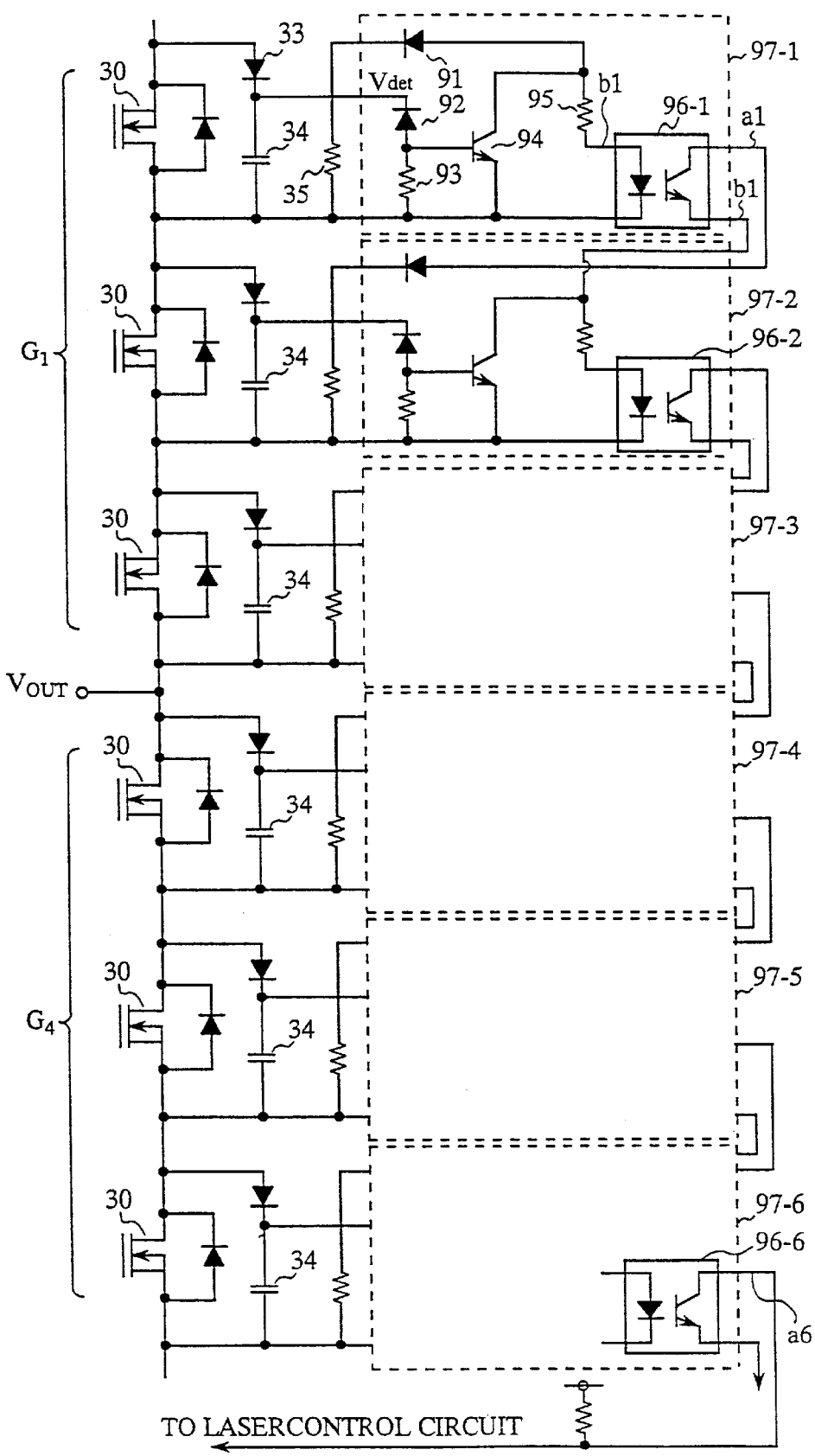
FIG. 25 is a schematic circuit diagram showing the structure of a main part of a laser power supply apparatus having a failure detecting mechanism for detecting the occurrence of a failure in a plurality of high-speed semiconductor switches connected in series in a pair of arms, according to a variant of the embodiments of the present invention as shown in FIGS. 1 and 2.
Figure 26:
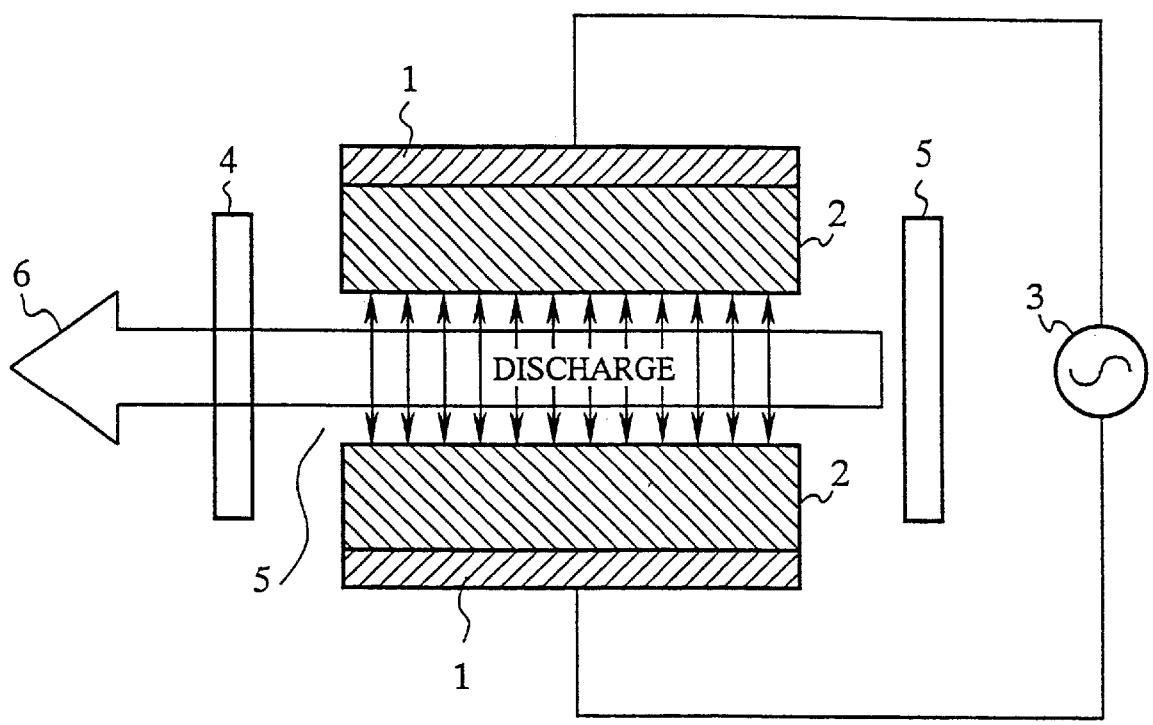
FIG. 26 is a diagram showing the structure of a laser device.
Figure 27:
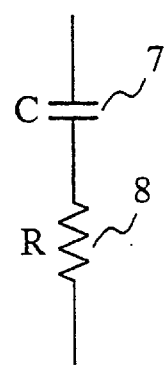
FIG. 27 is a schematic circuit diagram of an equivalent circuit of a pair of dielectric layers and a discharge area of the laser device of FIG. 26.
Figure 28:
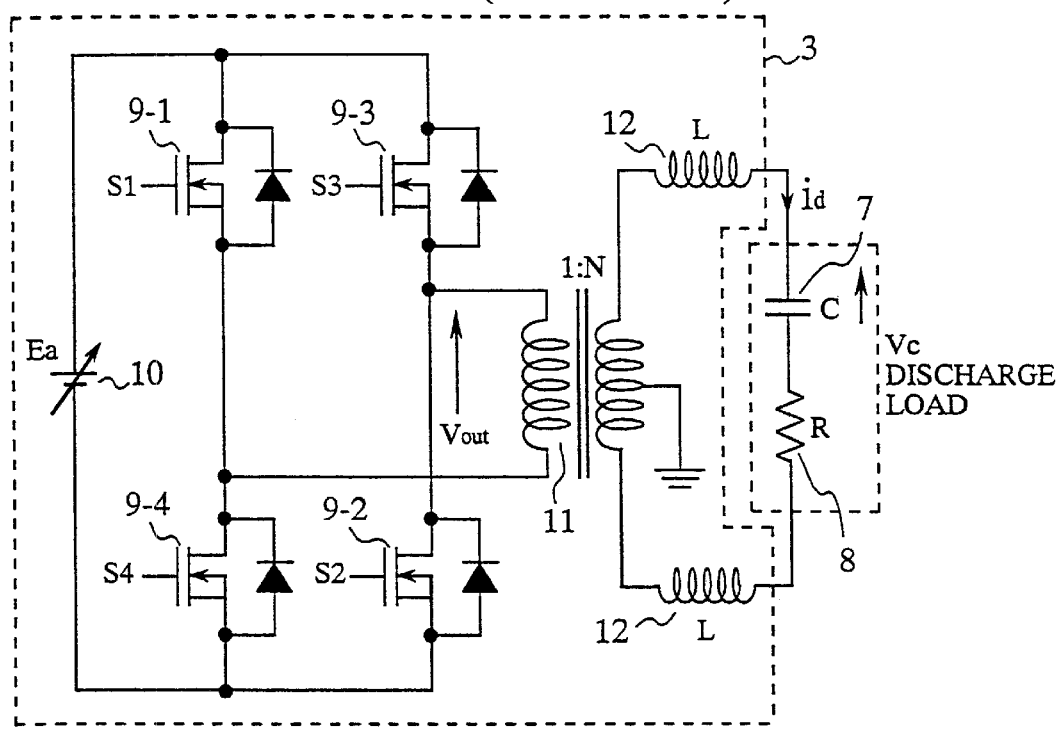
FIG. 28 is a schematic circuit diagram showing the structure of a prior art laser power supply apparatus.
Figure 29:
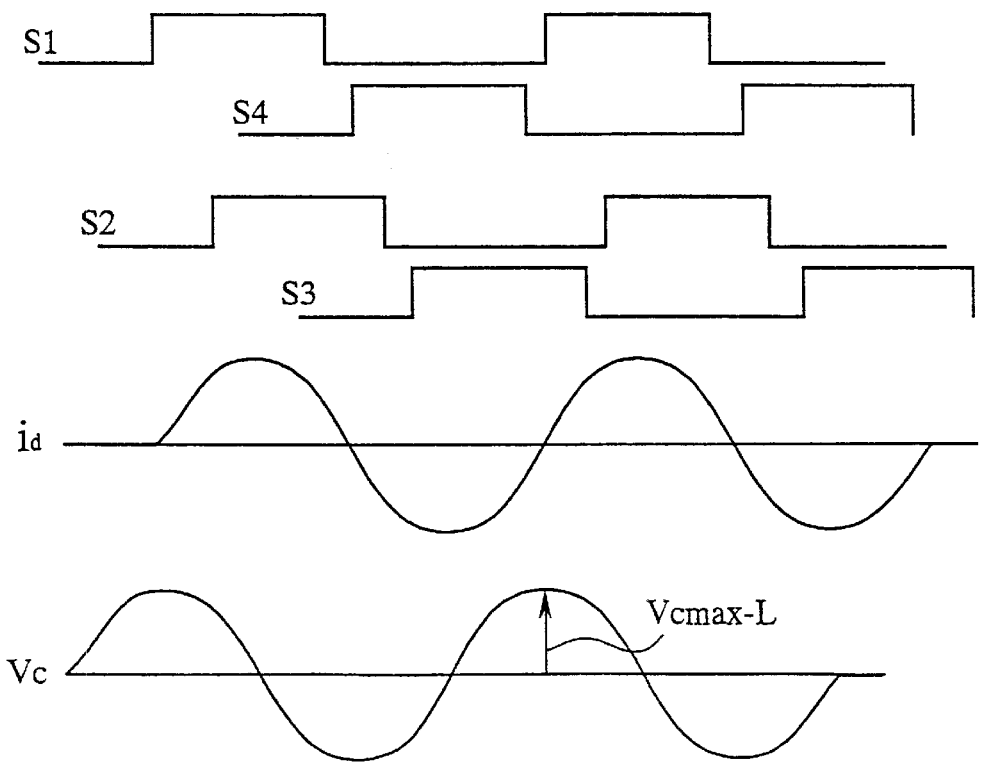
FIG. 29 is a diagram showing operations of the prior art laser power supply apparatus of FIG. 28.

Referring next to FIG. 25, there is illustrated a schematic circuit diagram showing the structure of a failure detecting unit that can be incorporated into the inverter of the present invention. The failure detecting unit of FIG. 25 is intended to detect the occurrence of a failure in the plurality of high-speed semiconductor switches 30 included in one pair of high-voltage and low-voltage arms, e.g. G1 and G4. The failure detecting unit includes a plurality of failure detecting circuits 97-1 to 97-6, as shown in FIG. 25, electrically connected with the plurality of high-speed semiconductor switches 30 by way of the plurality of snubber circuits, respectively. The plurality of failure detecting circuits 97-1 to 97-6 are connected in series. The most upstream one 97-1 of the plurality of failure detecting circuits having a photo-coupler 96-1 that can be turned on only when the voltage across the snubber capacitor 34 connected to the most upstream failure detecting circuit 97-1 is within a predetermined range. Each of the remainder of the plurality of failure detecting circuits having a photocoupler that can be turned on only when the voltage across the snubber capacitor 34 connected to each of the remaining failure detecting circuits is within a predetermined range and the photocoupler of a neighboring snubber capacitor upstream is turned on. The photocoupler 96-6 of the most downstream failure detecting circuit 97-6 ca be connected to the laser control circuit. In other words, when the photo-coupler disposed in each of the plurality of stages in series including one high-speed semiconductor switch 30 detects the occurrence of a failure, it can transfer information indicating the occurrence of a failure to its neighboring photo-coupler downstream.

Under normal conditions, the snubber capacitor 34 within each stage becomes charged up to a voltage Vdet, which is approximately equal to (Ea/n), where Ea is the voltage of the DC power supply and n is the number of the plurality of stages in series in the pair of high-voltage and low-voltage arms G1 and G4, as previously mentioned. In each stage, a first Zener diode 91 intended for detecting a short circuit has a voltage V91 less than the voltage Vdet across the snubber capacitor 34 and a second Zener diode 92 intended for detecting an overvoltage has a voltage V92 greater than the voltage Vdet across the snubber capacitor 34. Thus the first photo-coupler 96-1 is held in a state in which it is brought into conduction, under normal conditions. If the Vdet across the snubber capacitor 34 becomes less than the voltage V91 across the first Zener diode 91, the voltage at an input terminal b1 of the first photo-coupler 96-1 decreases and the first photo-coupler 96-1 is then turned off. If the voltage Vdet across the snubber capacitor 34 becomes greater than the voltage V92 across the second Zener diode 92, a transistor 94 having its collector connected to the input terminal b of the photo-coupler 96-1 via a resistor 95 is turned on and the first photo-coupler 96-1 is then turned off. Accordingly, only when the voltage Vdet across the snubber capacitor 34 is a voltage intermediate between the voltages V91 and V92 across the first and second Zener diodes, that is, the stage operates normally, the photo-coupler 96-1 is held in its ON state.

It is at least required that the first photo-coupler 96-1 is turned on in order to turn on its neighboring photo-coupler downstream 96-2, i.e. a detecting circuit 97. The relationship between these neighboring photo-couplers must be similarly established for each of other photo-couplers downstream up to the last photo-coupler 96-6 within the fourth arm G4. In other words, only if all stages operate normally, the last photo-coupler 96-6 can be held in its ON state and hence its output terminal a6 is held at a LOW level.

In general, if the MOSFET within each stage is broken, it can be short-circuited. In this case, the voltage Vdet across the snubber capacitor 34 becomes less than the voltage V91 across the first Zener diode. In contrast, in the event that the nonuniformity of the plurality of shared voltages across the plurality of switching stages occurs or serious lack of synchronism among the plurality of switching stages occurs, the voltage Vdet across the snubber capacitor becomes greater the voltage V92 across the second Zener diode. Accordingly, the laser power supply apparatus can determine whether or not the nonuniformity of the plurality of shared voltages across the plurality of switching stages occurs and whether or not serious lack of synchronism among the plurality of switching stages occurs, by monitoring the potential at the output terminal a6 of the last photo-coupler 96-6. The potential of the output terminal a6 of the last photo-coupler 96-6 is applied to the laser control circuit. If the voltage at the output terminal a6 of the last photo-coupler 96-6 is HIGH, the laser control circuit can stop the inverter. As previously explained, since the laser power supply apparatus can determine whether a failure has occurred in the inverter circuit as soon as possible by connecting the two different Zener diodes with the snubber capacitor within each of the plurality of stages, it can take measures against the failure. Thus the laser power supply apparatus can operate with a high degree of reliability.

Many widely different embodiments of the present invention may be constructed without departing from the spirit and scope of the present invention. It should be understood that the present invention is not limited to the specific embodiments described in the specification, except as defined in the appended claims.

What is claimed is:

1. A laser power supply apparatus for supplying AC power to a gas contained in a laser device by way of a pair of dielectric layers to form a high-frequency discharge in the gas, exciting the gas, thereby causing the laser device to radiate, said laser power supply apparatus comprising:

a DC power supply having a positive terminal and a negative terminal; and inverter means comprising two pairs of series-connected arms, the pairs of series-connected arms being connected in parallel, each pair of series-connected arms including a high voltage arm connected to the positive terminal of said DC power supply and a low voltage a rm connected to the negative terminal of said DC power supply, each arm including a plurality of semiconductor switches connected in series, each pair or of series-connected arms directly converting a DC voltage from said DC power supply into a series of AC output pulses having an AC voltage higher than the DC voltage and supplied to the laser device by simultaneously turning on or off said semiconductor or switches in respective arms, and furnishing the series of AC output pulses to the laser device at a pair of output terminals, each output terminal being located between said high voltage arm and said low voltage arm of each pair of series-connected arms.

2. The laser power supply apparatus according to claim 1, including a transformer with a core, a primary winding, and a plurality of secondary windings for driving said pairs of series-connected arms, wherein each of said arms includes a plurality of gate circuits and a plurality of drive circuits for respectively driving said plurality of semiconductor switches connected in series in each of said arms, each of said drive circuit s of each of said pair of said series-connected arms respectively receiving an AC voltage from a corresponding secondary winding of said transformer, wherein said drive circuits for driving said semiconductor switches of each arm of a pair of series-connected arms that are electrically most distant from said output terminal between said pair of series-connected arms receive AC voltages from said secondary windings that are closer to said core of said transformer than other secondary windings of said transformer.

3. The laser power supply apparatus according to claim 1, wherein said inverter means further includes a plurality of voltage-dividing capacitors electrically connected in parallel with respective ones of said plurality of semiconductor switches in each of said arms, and wherein said voltage-dividing capacitors in each arm connected in parallel with the one of said plurality of semiconductor switches in said arm electrically closest to said output terminal of said arm has a larger capacitance than other capacitors in said arm.

4. The laser power supply apparatus according to claim 1, wherein said inverter means further includes a plurality of voltage-dividing resistors electrically connected in parallel with respective ones of said plurality of semiconductor switches in each of said arms, and wherein said voltage-dividing resistors in each arm connected in parallel with the one of said plurality of semiconductor switches in said arm electrically closest to said output terminal of said arm has a smaller resistance than other resistors in said arm.

5. The laser power supply apparatus according to claim 1, wherein said inverter means further includes a plurality of snubber circuits electrically connected in parallel with respective ones of said plurality of semiconductor switches in each of said arms, each of said plurality of snubber circuits including a snubber capacitor and a snubber resistor connected in parallel with each other, and a diode connected in series with both of said snubber capacitor and said snubber resistor, and wherein the one of said snubber resistor in each of said arms connected to the corresponding one of said semiconductor switches that is electrically closest to said output terminal of said arm has a smaller resistance than the other snubber resistors in said arm.

6. The laser power supply apparatus according to claim 1, wherein said DC power supply is divided in to two parts between the positive terminal and the negative terminal and an intermediate point between the positive terminal and the negative terminal of said DC power supply is grounded.

7. The laser power supply apparatus according to claim 5, including a plurality of clamper circuits, each damper circuit being electrically connected in parallel with said snubber capacitor of one of said plurality of snubber circuits, each of said damper circuits including a Zener diode, a MOSFET having a gate connected to an anode of said Zener diode and a drain connected to a cathode of said Zener diode, a first resistor connected between the gate and a source of said MOSFET, and a second resistor having a first end connected to said snubber capacitor and a second end connected to the cathode of said Zener diode.

8. The laser power supply apparatus according to claim 1, wherein said laser power supply apparatus further comprises control means for generating a first pair of control signals for driving said high-voltage arms and a second pair of control signals for driving said low-voltage arms, the two pairs of control signals being out of phase with one another and triggering said plurality of arms to conduct during certain time periods having the same length, respectively, and for interchanging the first pair of control signals and the second pair of control signals at intervals.

9. The laser power supply apparatus according to claim 5, wherein said inverter means is controlled to furnish a series of AC output pulses having an arbitrary pulse width and an arbitrary pulse repetition period controlled by on/off controlling signals, and said inverter means has a charging mode in which said high-voltage arms and said low-voltage arms are brought into conduction at intervals so that either said high-voltage arms or said low-voltage arms are simultaneously conducting to cause said plurality of snubber circuits included in those arms brought into conduction to become charged during a period of time during which said inverter means furnishes no AC output pulse.

10. The laser power supply apparatus according to claim 1, further comprising delay means for gradually increasing a voltage from said DC power supply at a limited rate of increase and for applying the increasing voltage to said plurality of anus of said inverter means, said delay means having a time constant longer than a pulse repetition period of on/off controlling signals for simultaneously switching on and off said plurality of semiconductor switches in each of said plurality of arms.

11. The laser power supply apparatus according to claim 9, further comprising delay means for gradually increasing a voltage from said DC power supply at a limited rate of increase and for applying the rising voltage to said plurality of arms of said inverter means, said delay means having a time constant longer than the intervals in of the charging mode for alternately bringing said high-voltage arms and said low-voltage arms into conduction.

12. The laser power supply apparatus according to claim 9, wherein the length of the intervals is significantly shorter than a time constant of said snubber circuits connected in parallel with each of said plurality of semiconductor switches in each of said plurality of arms, the time constant being defined by said snubber capacitor and said snubber resistor included in each of said snubber circuits.

13. The laser power supply apparatus according to claim 1, wherein, immediately before generating an AC output pulse having an arbitrary pulse width, said inverter means generates an AC output having a different frequency.

14. The laser power supply apparatus according to claim 1, wherein, within a period of time during which said inverter means furnishes no AC output pulse, said inverter means generates an AC output having a different frequency.

15. The laser power supply apparatus according to claim 1, further comprising control means for detecting, rectifying, and integrating an output current from said inverter means, and for causing said inverter means to stop furnishing the AC output pulses when the output current after being rectified and integrated reaches a threshold value.

16. The laser power supply apparatus according to claim 1, further comprising a pair of reactors having the same inductances, respectively, inserted between said output terminals of said inverter means and said dielectric layers.

17. The laser power supply apparatus according to claim 1, where in at least one of said high-voltage arms includes a recovery circuit connected across said high-voltage arm and having a switch and a reactor connected in series, and at least a corresponding one of said low-voltage arms connected to one of said high-voltage arms includes a recovery circuit connected across said low-voltage arm and having a switch and a reactor connected in series, said two reactors being inductively coupled to each other.

18. The laser power supply apparatus according to claim 1, wherein in at least one of said high-voltage arms, a recovery circuit having a switch and a reactor connected in series is connected across each of said plurality of semiconductor switches, and in at least a corresponding one of said low-voltage arms connected to said one of said high-voltage arms, a recovery circuit having a switch and a reactor connected in series is connected across each of said plurality of semiconductor switches, the reactors of any two recovery circuits within one pair of said series-connected high-voltage and low-voltage arms being inductively coupled to each other.

19. The laser power supply apparatus according to claim 1, wherein said inverter means includes a plurality of gate circuits, each gate circuit corresponding to one of said plurality of arms, and including a plurality of drive circuits for respectively driving said plurality of semiconductor switches in each of said plurality of arms, and wherein each of said plurality of drive circuits includes a monostable multivibrator, responsive to an optical signal, for turning on a corresponding semiconductor switch, enabling said semiconductor switch to conduct only within a certain period of time.

20. The laser power supply apparatus according to claim 1, wherein said inverter means further includes a plurality of snubber circuit s electrically connected in parallel with said plurality of semiconductor switches in each of said arms, respectively, each of said plurality of snubber circuits including a snubber capacitor and a snubber resistor connected in parallel with each other, and a diode connected in series with both of said snubber capacitor and said snubber resistor, and said inverter means further includes a plurality of failure detecting circuits electrically connected to said plurality of semiconductor switches by way of said plurality of snubber circuits, respectively, said plurality of failure detecting circuits being connected in series, a most upstream one of said plurality of failure detecting circuits having a photocoupler that can be turned on only when the voltage across the snubber capacitor connected to said most upstream failure detecting circuit is within a predetermined range, each of the other of said plurality of failure detecting circuits having a photocoupler that can be turned on only when the voltage across the snubber capacitor connected to each of the other failure detecting circuits is within a predetermined range and the photocoupler of a neighboring snubber capacitor upstream is turned on, and the output of the photocoupler of at least one of said plurality of failure detecting circuits is input to control means for controlling said inverter means.

* * * * *